US008614983B2

(12) United States Patent
Classon et al.

(10) Patent No.: US 8,614,983 B2
(45) Date of Patent: Dec. 24, 2013

(54) RESOURCE ALLOCATION METHOD, NETWORK DEVICE, AND WIRELESS SYSTEM

(75) Inventors: Brian Classon, Palatine, IL (US); Bingyu Qu, Shenzhen (CN); Fredrik Berggren, Kista (SE); Lixia Xue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 222 days.

(21) Appl. No.: 13/176,285

(22) Filed: Jul. 5, 2011

(65) Prior Publication Data

US 2011/0274076 A1 Nov. 10, 2011

Related U.S. Application Data

(63) Continuation of application No. PCT/CN2010/070040, filed on Jan. 6, 2010.

(30) Foreign Application Priority Data

Jan. 6, 2009 (CN) .......................... 2009 1 0002378

(51) Int. Cl.
*H04W 4/00* (2009.01)

(52) U.S. Cl.
USPC ......................................................... 370/329

(58) Field of Classification Search
USPC .................................................. 370/310–350
See application file for complete search history.

(56) References Cited

U.S. PATENT DOCUMENTS

| 8,179,849 B2 * | 5/2012 | Callard et al. ................ 370/329 |
| 2008/0310362 A1 | 12/2008 | McBeath et al. | |
| 2010/0034152 A1 * | 2/2010 | Imamura ....................... 370/329 |
| 2010/0130218 A1 * | 5/2010 | Zhang et al. .................. 455/450 |
| 2010/0195586 A1 * | 8/2010 | Choi et al. .................... 370/329 |
| 2010/0232373 A1 * | 9/2010 | Nory et al. .................... 370/329 |
| 2010/0232375 A1 * | 9/2010 | Asanuma ...................... 370/329 |
| 2010/0322158 A1 * | 12/2010 | Lee et al. ...................... 370/329 |
| 2011/0007695 A1 * | 1/2011 | Choi et al. .................... 370/329 |
| 2011/0164550 A1 * | 7/2011 | Chen et al. .................... 370/315 |
| 2011/0243090 A1 * | 10/2011 | Grovlen et al. ............... 370/329 |

FOREIGN PATENT DOCUMENTS

| CN | 101043742 | 9/2007 |
| CN | 101064955 | 10/2007 |
| CN | 101155194 | 4/2008 |
| WO | 2007/083830 A1 | 7/2007 |

(Continued)

OTHER PUBLICATIONS

First Chinese Office Action issued Sep. 5, 2012 in corresponding Chinese Patent Application No. 200910002378.4.

(Continued)

*Primary Examiner* — Kwang B Yao
*Assistant Examiner* — Juvena Loo
(74) *Attorney, Agent, or Firm* — Staas & Halsey LLP

(57) ABSTRACT

A resource allocation method, a network device and a wireless system are disclosed. The method includes: sorting Resource Blocks (RBs) used by a terminal of a first system and a terminal of a second system according to a use situation of the RBs used by the terminal of the first system and the terminal of the second system; and allocating the sorted RBs. When some RBs are available to a Long Term Evolution (LTE) terminal, coexistence of an LTE-Advanced (LTE-A) terminal and the LTE terminal is enabled, and compatibility between the LTE-A terminal and the LTE terminal is ensured.

12 Claims, 21 Drawing Sheets

(56) References Cited

FOREIGN PATENT DOCUMENTS

| WO | 2007/131558 | | 11/2007 |
|---|---|---|---|
| WO | WO 2008115003 A2 | * | 9/2008 |
| WO | WO 2010015285 A1 | * | 2/2010 |
| WO | WO 2010049754 A1 | * | 5/2010 |
| WO | 2010/078843 | | 7/2010 |

OTHER PUBLICATIONS

*Signalling of PRB allocations for LTE downlink*, 3GPP TSG-RAN Working Group 1 #49, Tdoc R1-072303, Kobe, Japan, May 7-11, 2007.
*On the scenario and channel model for LTE-Advanced*, 3GPP TSG RAN WG1 #53, R1-081823, Kansas City, MO, May 5-9, 2008.
*DL/UL Resource Signalling for LTE-Advanced System*, TSG-RAN WG1#57, R1-091693, San Francisco, CA, May 4-8, 2009, pp. 1-6.
International Search Report, mailed Apr. 15, 2010, in International Application No. PCT/CN2010/070040.
3$^{rd}$ Generation Partnership Project; Technical Specification Group Radio Access Network; Evolved Universal Terrestrial Radio Access (E-UTRA); Physical Channels and Modulation (Release 10), 3GPP TS 36.211 V10.2.0, Jun. 2011, pp. 1-103.
3$^{rd}$ Generation Partnership Project; Technical Specification Group Radio Access Network; Evolved Universal Terrestrial Radio Access (E-UTRA); Physical layer procedures (Release 10), 3GPP TS 36.213 V10.2.0, Jun. 2011, pp. 1-120.
Hujun Yin et al., "16m Resource Block Indexing Schemes Evaluation", IEEE 802.16 Broadband Wireless Access Working Group, Mar. 10, 2008, pp. 1-24.
Shkumbin Hamiti, "The Draft IEEE 802.16m System Description Document", IEEE 802.16 Broadband Wireless Access Working Group, Jun. 16, 2008, pp. 1-55.
Written Opinion of the International Searching Authority mailed Apr. 15, 2010 issued in corresponding International Patent Application No. PCT/CN2010/070040.
European Search Report dated Nov. 25, 2011 issued in corresponding European Patent Application No. 10729102.3.

* cited by examiner

RESOURCE ALLOCATION METHOD, NETWORK DEVICE, AND WIRELESS SYSTEM

CROSS-REFERENCE TO RELATED APPLICATIONS

This application is a continuation of International Application No. PCT/CN2010/070040, filed on Jan. 6, 2010, which claims priority to Chinese Patent Application No. 200910002378.4, filed on Jan. 6, 2009, both of which are hereby incorporated by reference in their entireties.

FIELD OF THE INVENTION

The present invention relates to wireless communications technologies, and in particular, to a resource allocation method, a network device, and a wireless system.

BACKGROUND OF THE INVENTION

In a Long Term Evolution (LTE) system, a network notifies exact system bandwidth adopted by an uplink (UL) and a downlink (DL) to each terminal in the network through broadcast signaling, and then the terminal determines resource allocation granularity of some resource allocation methods according to the number of Physical Resource Blocks (PRBs) included in the system bandwidth. Afterward, through resource allocation signaling, the network sends specific resource allocation information to the terminal that needs to transmit data, and the terminal determines a time-frequency resource location allocated specifically by the network according to information of the received resource allocation signaling, and sends or receives data on the corresponding time-frequency resource location, so as to implement data transmission and communication between the network and the terminal.

In an advanced LTE (LTE-A) system, a possible solution for supporting large bandwidth is to aggregate multiple component carriers, namely, schedule resources of the multiple component carriers to be used by one terminal at the same time. Spectrum occupied by the multiple component carriers may be continuous or discontinuous; bandwidth of the component carriers may be the same or different; each component carrier may be a carrier compatible with an LTE terminal, or may only be a carrier supporting an LTE-A terminal. If the component carrier supports only the LTE-A terminal, the LTE terminal is incapable of performing data transmission or communication on this LTE-A carrier. In the prior art, to support features of the LTE-A system, not only a carrier is configured as a carrier supporting only LTE-A terminal, but also some PRB resources are configured in a component carrier as resources unavailable to the LTE terminal. On such resources, design can be performed on requirements, such as a pilot structure, of the LTE-A system, and the design may be different from that of a backward system, so that the features of the LTE-A system are supported, the carrier bandwidth configuration different from the bandwidth of the LTE system is supported, each component carrier is a backward-compatible carrier, and flexibility of system design is increased.

In the process of implementing the present invention, the inventors find at least the following problems in the prior art: in a carrier of an existing LTE-A system, some PRB resources may be configured as unavailable to an LTE terminal; if PRB sorting is performed on all PRB resources in a sequence similar to that of Resource Blocks (RBs) of an LTE system, such processing as RB grouping or hopping mapping is performed on the PRB resources accordingly, and then resource allocation is performed on the PRB resources, conflict and congestion may occur at the time of allocating LTE resources and LTE-A resources, so that an LTE-A terminal cannot be well compatible with the LTE terminal in this carrier.

SUMMARY OF THE INVENTION

The embodiments of the present invention provide a resource allocation method, a network device, and a wireless system to make a resource allocation method of an LTE-A terminal compatible with that of an LTE terminal.

An embodiment of the present invention provides a resource allocation method, where the resource allocation method includes:

sorting RBs used by a terminal of a first system and a tell final of a second system according to a use situation of the RBs used by the terminal of the first system and the terminal of the second system; and allocating the sorted RBs, where the second system is a system which is evolved from the first system and is capable of providing a communication service for the terminal of the first system.

An embodiment of the present invention provides a network device, where the network device includes:

a sorting unit, configured to sort RBs used by a terminal of a first system and a terminal of a second system according to a use situation of the RBs used by the terminal of the first system and the terminal of the second system; and an allocating unit, configured to allocate the RBs sorted by the sorting unit.

An embodiment of the present invention provides a wireless system, where the wireless system includes:

a network device, configured to sort RBs used by a terminal of a first system and a terminal of a second system according to use situation of the RBs used by the terminal of the first system and the terminal of the second system, and allocate the sorted RBs.

The foregoing technical solution reveals that: the embodiments of the present invention take account of the use situation of PRB resources used by the LTE system to prevent the problem of resource allocation incompatibility between an LTE-A terminal and an LTE terminal when all PRB resources of the LTE-A system are sorted uniformly in a way similar to the sorting method of the LTE system in the prior art.

DETAILED DESCRIPTION OF THE EMBODIMENTS

Figure 1:
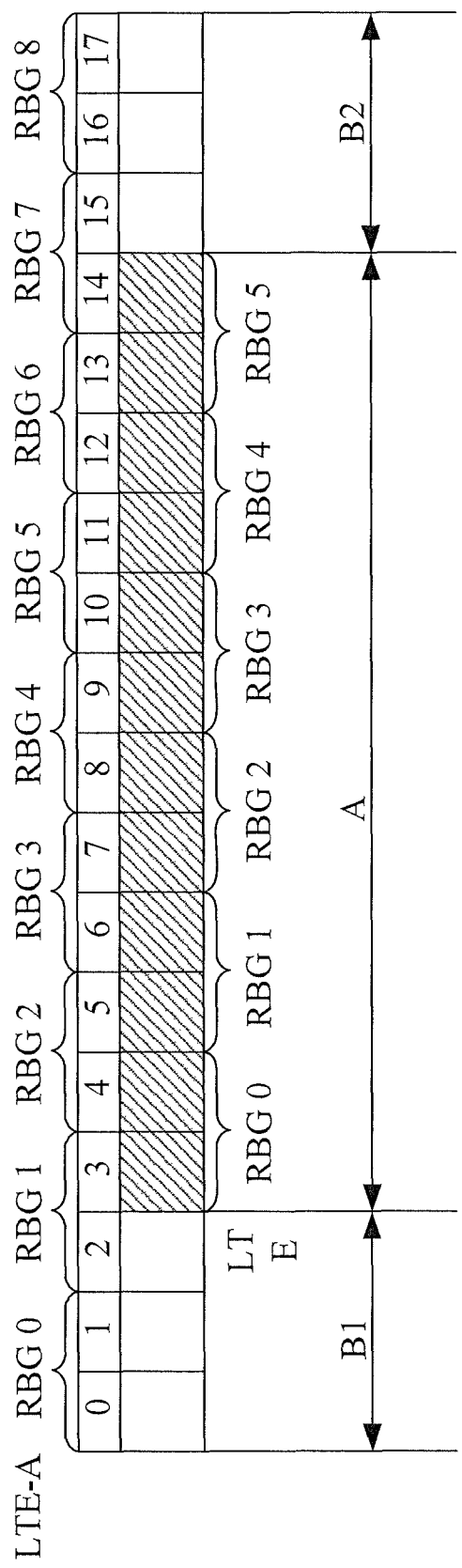
FIG. 1 is a schematic diagram of a resource allocation method in an RA type0 mode in a DL in the prior art.

The technical solution under the present invention is further described below with reference to accompanying drawings and embodiments.

In DL resource allocation of an LTE system, resource allocation signaling corresponding to each time transmission unit bears the type of terminal resource allocation and the corresponding resource allocation information. The terminal resource allocation is categorized into these types: Resource Allocation (RA) type0, RA type1, and RA type2. RA type0 refers to indicating an allocation situation of Resource Block Groups (RBGs) in a bitmap mode, each bit indicates whether to allocate a corresponding RBG, one RBG is the minimum granularity of resource allocation, and each RBG includes several RBs. The number of RBs included in each RBG depends on the total number of RBs included in system bandwidth, namely, the RBG size is a function of the number of RBs included in the system bandwidth. Different system bandwidth may correspond to different RBG sizes. That is, the minimum granularity of resource allocation differs. Table 1 shows a relation between the number $N_{RB}^{DL}$ of PRBs included in system bandwidth and the granularity P.

TABLE 1

| $N_{RB}^{DL}$ | P |
|---|---|
| ≤10 | 1 |
| 11~26 | 2 |
| 27~63 | 3 |
| 64~110 | 4 |

If the number of PRBs included in the system bandwidth is $N_{RB}^{DL}$ and the size (namely, granularity) of each RBG is P, as regards the RA type0 allocation mode, in the resource allocation signaling, $$N_{RBG} = \left\lceil \frac{N_{RB}^{DL}}{P} \right\rceil$$

bits are required to indicate the specific resource allocation situation, where ⌈*⌉ refers to rounding up.

If the system bandwidth is the same, the number of bits in the resource allocation signaling occupied by RA type1 is the same as the number of bits in the resource allocation signaling occupied by RA type0, and the number of bits is also indicated in a bitmap mode. Information of one bit in the resource allocation signaling distinguishes whether the resource allocation type is RA type0 or RA type1. RA type1 divides the RBGs into P RBG subsets according to the system bandwidth. For example, if the number of RBs included in each RBG is P in RA type0, namely, the granularity of each RBG is P, RA type1 divides the RBGs into P RBG subsets. Therefore, ⌈log₂(P)⌉ bits are required for indicating an RBG subset to which a resource of a scheduled terminal belongs. To be capable of indicating more resources, one bit further needs to be used to indicate a starting direction of resource allocation, namely, indicate whether the resource allocation starts from the left side or from the right side. Therefore, the number of bits for indicating allocated RBs is $$N_{RB}^{TYPE1} = \left\lceil \frac{N_{RB}^{DL}}{P} \right\rceil - \lceil \log_2(P) \rceil - 1.$$

Each bit indicates whether an RB in a corresponding RBG subset is invoked, and the resource allocation of the scheduled terminal is only limited to be performed in one subset.

If the system bandwidth is the same, the number of bits in the resource allocation signaling occupied by RA type2 is different from the number of bits in the resource allocation signaling occupied by RA type0 (or RA type1), and their resource allocation methods also differ. In the resource allocation signaling of RA type2, one bit indicates whether the resource allocation is Localized Virtual Resource Block (LVRB) allocation or Distributed Virtual Resource Block (DVRB) allocation. As regards the LVRB, a sequence number of LVRB corresponds to a sequence number of a PRB one-to-one. Therefore, LVRBs are allocated in a centralized way with respect to physical resources. As regards the DVRB, the mapping from each Virtual Resource Block (VRB) to a PRB is defined by a fourth-order diversity interleaver, and is already uniquely defined. In two timeslots in one subframe, each VRB is mapped onto different PRBs. That is, the same VRB of two timeslots is mapped onto different PRBs, and a gap value exists between them, as shown in Table 2. Depending on the number of PRBs included in the system, the number of gap values may be 1 or 2. The specific gap values are uniquely determined in Table 2. When 2 gap values are available, one bit in the resource allocation signaling indicates whether to apply gap 1 or gap 2. The resource allocation signaling indicates the sequence number of a starting VRB and the number of continuous VRBs. According to the rule of mapping from the VRB to the PRB, all PRBs corresponding to the VRBs allocated in the first timeslot are determined; according to the gap value applied in Table 2, all PRBs corresponding to the VRBs allocated in the second timeslot are determined. If the system bandwidth is the same, the information length differs between RA type2 and RA type0 (or RA type1). The terminal obtains the resource allocation type by detecting the information bit length blindly.

TABLE 2

| System BW ($N_{RB}^{DL}$) | Gap ($N_{gap}$) | |
| --- | --- | --- |
| | $1^{st}$ Gap ($N_{gap,1}$) | $2^{nd}$ Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

In the UL resource allocation of the LTE system, the resource allocation signaling indicates the sequence number of the starting VRB and the number of continuous VRBs allocated. One bit in the resource allocation information indicates whether resource hopping is supported. Specifically, the hopping mode may be configured as whether the timeslot border supports hopping or the subframe border supports hopping, which is notified through broadcast signaling. Whether the hopping of all terminals in a cell is bordered by the subframe or by the timeslot is uniform. The hopping mode is categorized into UL hopping type1 and UL hopping type2.

When the system is extended from the LTE to the LTE-A, some PRBs in a carrier of the LTE-A system may be invisible to the LTE terminal in order to support features of the LTE-A system and improve flexibility of configuring system bandwidth. The resource allocation method of the LTE terminal and the PRB sorting method must be performed on the PRBs visible to the LTE terminal. As regards the RBs dedicated to the LTE-A terminal and invisible to the LTE terminal, if the PRBs are sorted and allocated in a way similar to the LTE mode, resource allocation for the LTE terminal and the LTE-A terminal in this carrier suffers from conflict and congestion, and loopholes and waste occur in some PRB resources. Such problems increase complexity of a scheduler although the scheduler can relieve the problems to some extent. Consequently, the resource allocation method of the LTE cannot be well compatible with that of the LTE-A. The following describes the problems that occur in various resource allocation methods.

As regards a resource allocation method in a DL:

It is assumed that a carrier of LTE-A is composed of 18 PRBs, and the sequence numbers of the PRBs are sequentially defined as 0, 1, 2, . . . , and 17, which include part A, part $B_1$, and part $B_2$. Part A is available to both the LTE terminal and the LTE-A terminal, and is composed of 12 PRBs, and the sequence numbers corresponding to the PRBs are 3, 4, . . . , and 14; part $B_1$ and part $B_2$ are available to the LTE-A terminal but unavailable to the LTE terminal; part $B_1$ includes 3 PRBs, and part $B_2$ also includes 3 PRBs; the sequence numbers of the PRBs included by part $B_1$ are 0, 1, and 2, and the sequence numbers of the PRBs included by part $B_2$ are 15, 16, and 17. It can be known according to Table 1 that, an RBG is composed of two PRBs in both the LTE-A system and the LTE system.

(1) RA type0

FIG. 1 is a schematic diagram of a resource allocation method in an RA type0 mode in a DL in the prior art. As shown in FIG. 1, RB resources of part A are available to both an LTE terminal and an LTE-A terminal, and RB resources of part $B_1$ and part $B_2$ are available only to the LTE-A terminal. The RA type0 method employs a bitmap mode, each bit indicates information about whether a corresponding RBG is allocated or not, and the size of the RBG corresponds to the system bandwidth, as shown in Table 1. As shown in FIG. 1, the LTE resource allocation is intermixed with the LTE-A resource allocation so that some RBs are not indicated or used effectively. For example, if the LTE-A uses the corresponding RBG3 (namely, RB6, RB7), RBG1 and RBG2 corresponding to the LTE cannot be allocated to the LTE terminal. In this way, the corresponding RB5 and RB8 are idle, and resources are wasted for lack of effective signaling indication.

(2) RA type1

Figure 2:
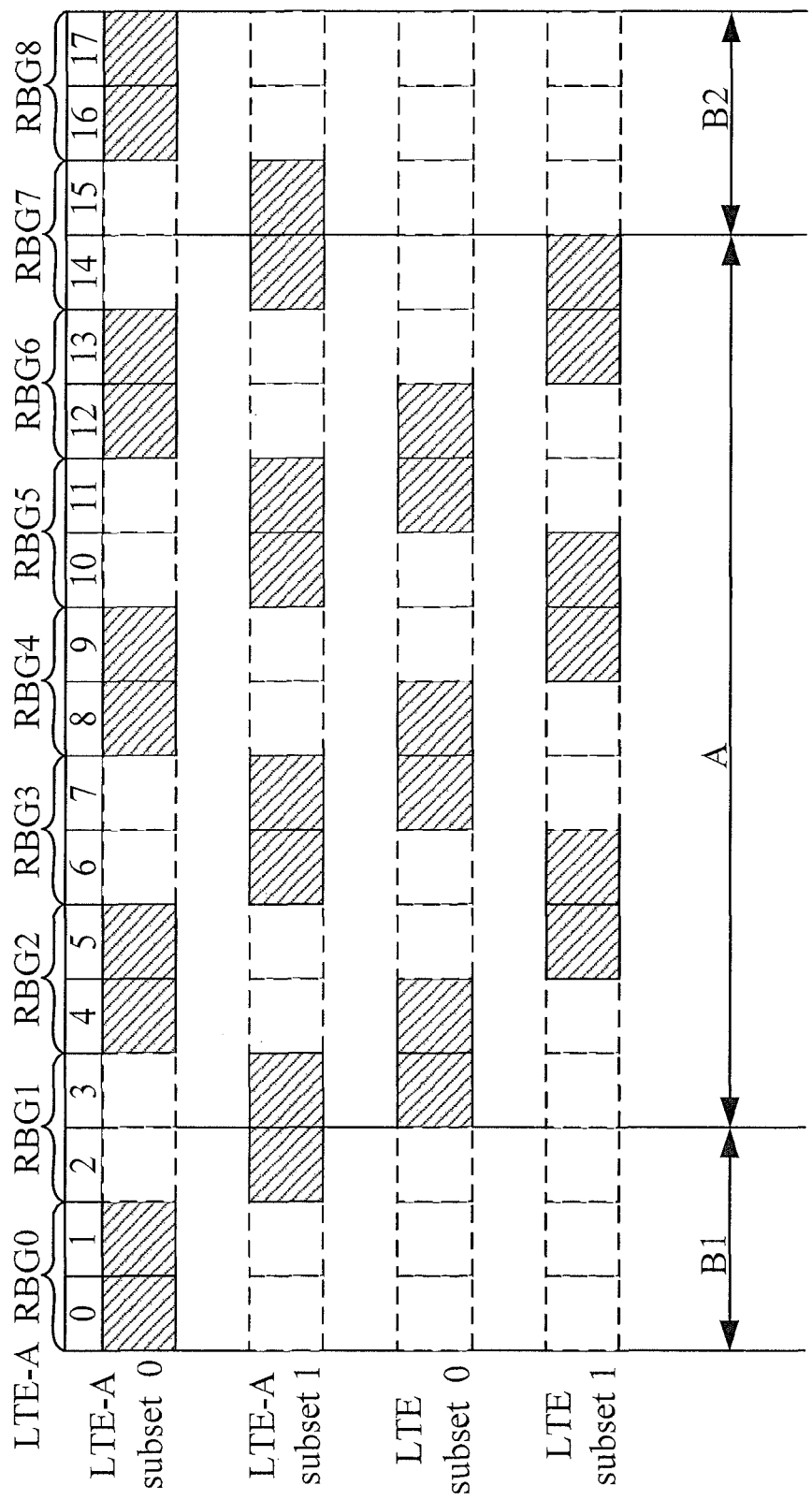
FIG. 2 is a schematic diagram of a resource allocation method in an RA type1 mode in a DL in the prior art.

FIG. 2 is a schematic diagram of a resource allocation method in an RA type1 mode in a DL in the prior art. As shown in FIG. 2, the RA type1 method in an LTE system is: deciding to divide resources into P (the size of each RBG) RBG subsets according to the system bandwidth; selecting one of the subsets; and using a bitmap mode to indicate information about whether the corresponding RB in the selected subset is allocated or not. FIG. 2 reveals that the intermixing of the LTE resource allocation and the LTE-A resource allocation may cause congestion of RBGs for each other. For example, if the LTE-A system uses subset 0, subset 0 and subset 1 corresponding to the LTE system will be affected.

(3) RA type2 LVRB

Figure 3:
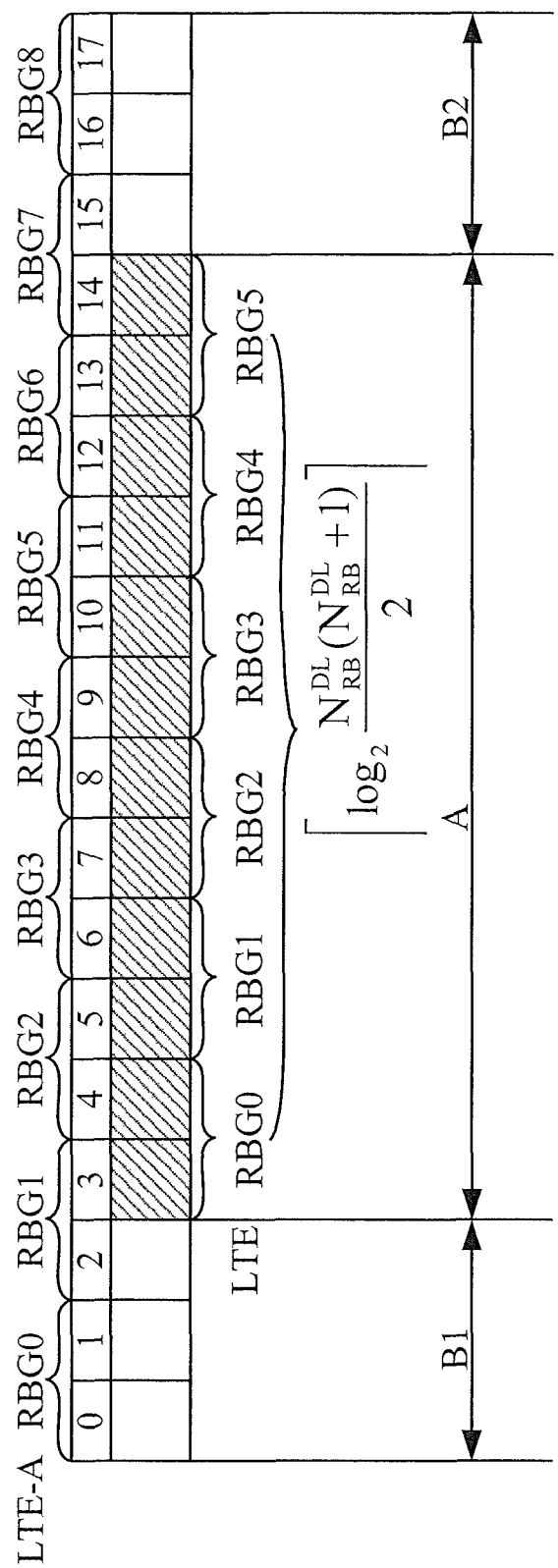
FIG. 3 is a schematic diagram of a resource allocation method in an RA type2 LVRB mode in a DL in the prior art.

FIG. 3 is a schematic diagram of a resource allocation method in an RA type2 LVRB mode in a DL in the prior art. As shown in FIG. 3, the RA type2 signaling in the LTE system indicates information about the starting VRB sequence number and the number of continuous VRBs allocated. As regards the LVRB, a sequence number of a VRB corresponds to a sequence number of a PRB one-to-one. Therefore, LVRBs are allocated in a centralized way with respect to physical resources. As shown in FIG. 3, the allocation of continuous VRBs and the allocation of continuous PRBs can be indicated simultaneously. For the same PRB3, VRB3 corresponds to the LTE-A terminal, but VRB0 corresponds to the LTE terminal. As a result of the resource indication, an offset exists between the mapping between a PRB and the VRB of the LTE terminal, and the mapping between the same PRB and the VRB of the LTE-A terminal.

(4) RA type2 DVRB

Figure 4:
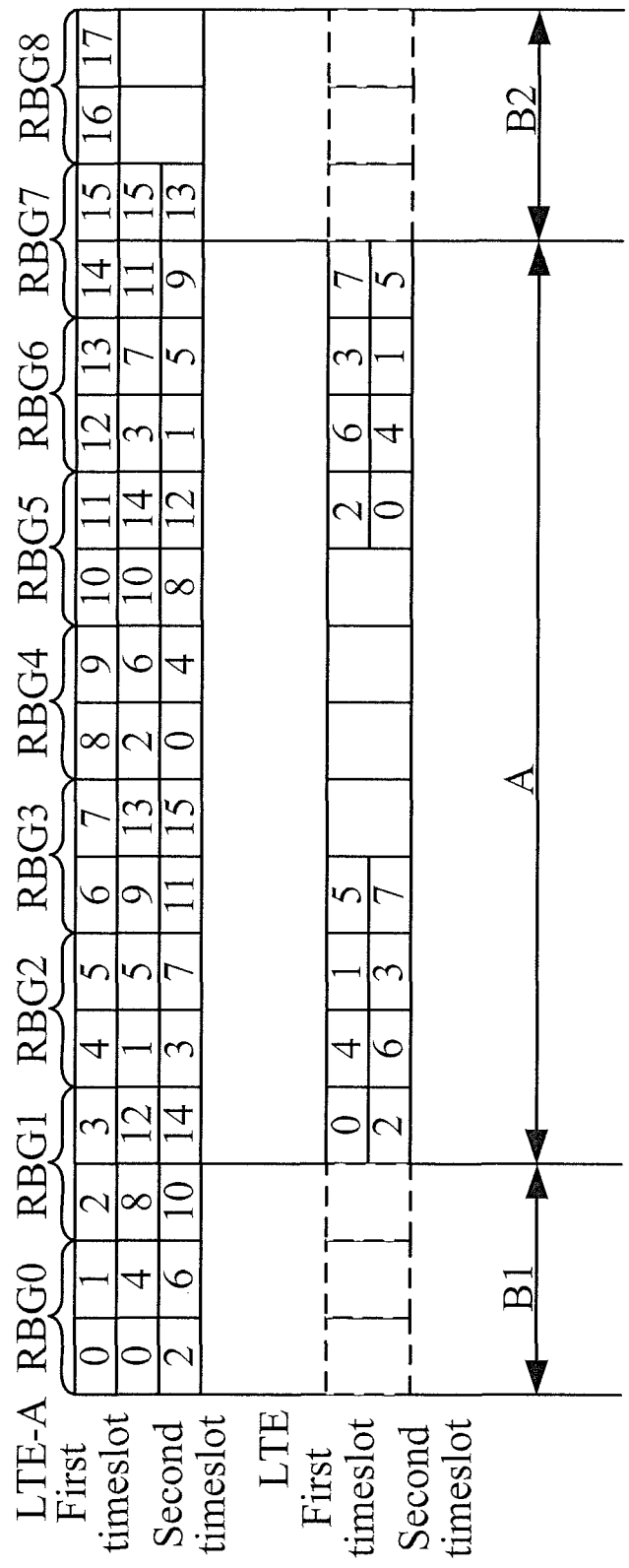
FIG. 4 is a schematic diagram of a resource allocation method in an RA type2 DVRB mode in a DL in the prior art.

FIG. 4 is a schematic diagram of a resource allocation method in an RA type2 DVRB mode in a DL in the prior art. As shown in FIG. 4, the RA type2 signaling in the LTE system indicates information about the starting VRB sequence number and the number of continuous VRBs allocated. For the LTE system, the number of RBs is 12; for the LTE-A system, the number of RBs is 18. In this way, the number of PRBs added into the DVRBs (N_VRB) of the LTE system may be different from the N_VRB of the LTE-A system. In this way, resource conflict occurs between the LTE system and the LTE-A system in the case of VRB-to-PRB mapping. The $N_{RB}^{DL}$ of the LTE-A system is 18, and the $N_{RB}^{DL}$ of the LTE system is 12. Table 2 reveals that only one gap value exists.

Therefore, the calculation formula of the number of RBs added into the DVRBs is N_VRB=2[min{$N_{gap}$,$N_{RB}^{DL}$−$N_{gap}$}]. Further, as shown in Table 2, the $N_{gap}$ of the LTE-A system is 8, and the $N_{gap}$ of the LTE system is also 8. According to the foregoing calculation formula, the number of RBs added into the DVRBs in the LTE-A system is 16, and the number of PRBs added into the DVRBs in the LTE system is 8. Meanwhile, the first timeslot and the second timeslot need to satisfy the $N_{gap}$ relation. Therefore, as shown in FIG. 4, in the LTE-A system, the sequence numbers of PRBs added into the DVRBs are 0 to 15; in the LTE system, the sequence numbers of the PRBs added into the DVRBs are 3 to 6 and 11 to 14; the sequence number in each timeslot is the sequence number of the corresponding VRB. For example, in the LTE-A system, the sequence number of the VRB corresponding to the PRB with the sequence number of 1 is 4, and so on. Therefore, according to the RA type2 resource allocation mode in the prior art, after the LTE is extended to the LTE-A, even if a VRB allocated to the LTE system is different from a VRB allocated to the LTE-A system, the two different VRBs may be mapped to the same PRB because the number of RBs involved in the VRB-to-PRB mapping of the LTE system is different from that of the LTE-A system. For example, VRB1 of the LTE system corresponds to PRB5, but VRB5 of the LTE-A system corresponds to PRB5, which leads to conflict of resource indication.

As regards a resource allocation method in a UL:

Also, it is assumed that a carrier of LTE-A is composed of 18 PRBs, and the sequence numbers of the PRBs are sequentially defined as 0, 1, 2, . . . , and 17, which include part A, part $B_1$, and part $B_2$. Part A is available to both an LTE terminal and an LTE-A terminal, and is composed of 12 PRBs, and the sequence numbers of the corresponding PRBs are 3, 4, . . . , and 14; part $B_1$ and part $B_2$ are available to the LTE-A terminal but unavailable to the LTE terminal; part $B_1$ includes 3 PRBs, and part $B_2$ also includes 3 PRBs; the sequence numbers of the PRBs included by part $B_1$ are 0, 1, and 2, and the sequence numbers of the PRBs included by part $B_2$ are 15, 16, and 17. As shown in Table 1, an RBG is composed of two PRBs in both the LTE-A system and the LTE system.

(1) No Hopping

Similar to the DL RA type2 LVRB resource allocation method, this method indicates information about the starting VRB sequence number and the number of continuous VRBs allocated. The VRB sequence number corresponds to the PRB sequence number one-to-one. This method is similar to the RA type2 LVRB method, and is not repeated here any further.

(2) Hopping

Figure 5:
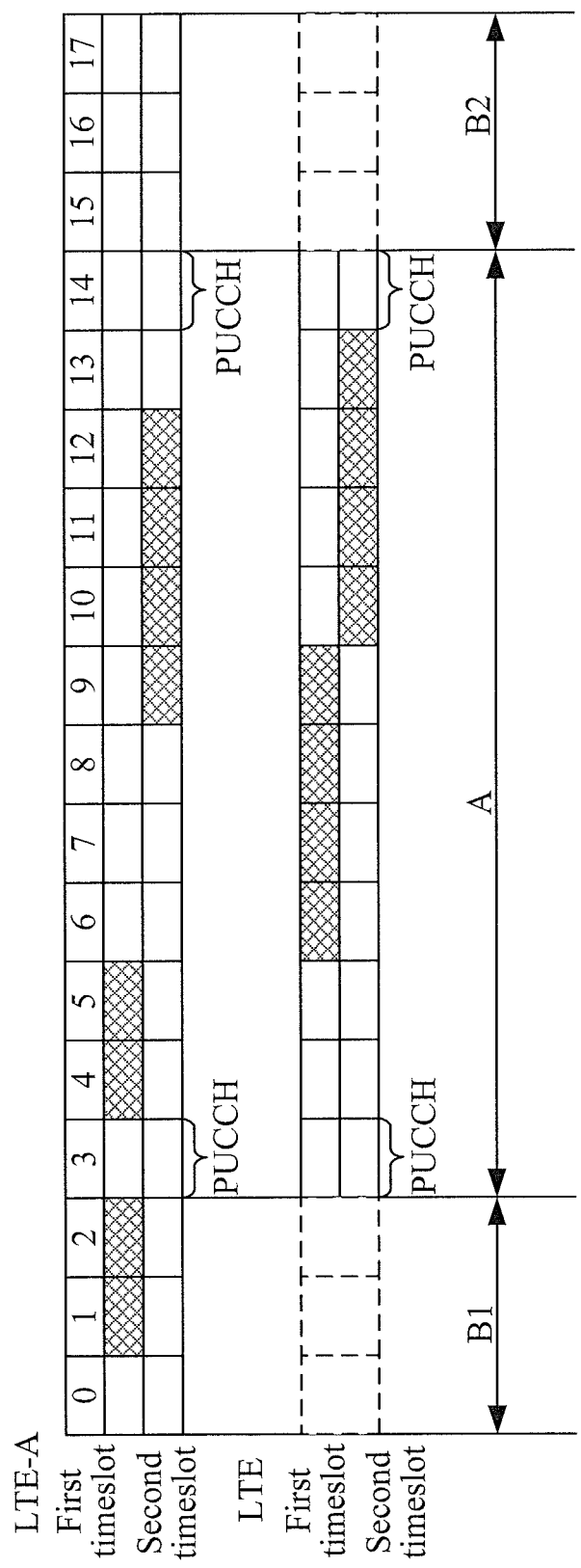
FIG. 5 is a schematic diagram of a resource allocation method in a hopping mode in a UL in the prior art.

FIG. 5 is a schematic diagram of a resource allocation method in a hopping mode in a UL in the prior art. As shown in FIG. 5, in the UL, a Physical Uplink Control Channel (PUCCH) needs to be transmitted. As shown in FIG. 5, the number of RBs occupied by the PUCCH (N_RB_PUCCH) is 2, and the 2 RBs are located on both ends of area A. For an LTE-A terminal, the intermediate PRB resources in this area are occupied, and therefore, all physical resources for data transmission in the area are no longer continuous. FIG. 5 illustrates UL hopping type1. If the N_UL_RB of the LTE system is unequal to the N_UL_RB of the LTE-A system, which are 12 and 18 respectively in FIG. 5, like the case of RA type2 DVRB, the number of PRBs involved in the UL resource allocation in the LTE system also differs from that in the LTE-A system. For example, in FIG. 5, the number of RBs involved in UL resource allocation (N_UL_PUSCH) in the LTE system is 10 (12 RBs included in the LTE system minus 2 RBs occupied by the PUCCH), and the number of RBs involved in UL resource allocation (N_UL_PUSCH) in the LTE-A system is 16 (18 RBs included in the LTE-A system minus 2 RBs occupied by the PUCCH). In this way, the rule of mapping from the VRB to the PRB leads to conflict and collision of resources between the LTE system and the LTE-A system. For example, as shown in FIG. 5, in the first timeslot, PRB6 to PRB9 are allocated to the LTE terminal; PRB1 to PRB5 exclusive of PRB3 are allocated to the LTE-A terminal. Such resources are orthogonal in this timeslot (the sequence numbers of the resources are not overlapped), namely, the resources allocated to the LTE terminal are not overlapped with the resources allocated to the LTE-A terminal in this timeslot, but the PRB6-PRB9 and PRB1-PRB5 hop to the second timeslot and correspond to PRB10 to PRB13 and PRB9 to PRB12 respectively (the principles of hopping are covered in the prior art, and are not repeated). In this case, resource allocation conflicts on PRB10 to PRB12 (the resources are overlapped). Consequently, on PRB10 to PRB12 in the second timeslot, the data sent by the LTE terminal interferes with the data sent by the LTE-A terminal drastically, and conflict of resource allocation occurs.

In conclusion, when some RBs in a carrier of the LTE-A system are unavailable to the LTE terminal, if the UL/DL resource allocation methods of the LTE system are applied to the UL/DL resource allocation methods of the LTE-A system, the resource allocation to the LTE terminal and the LTE-A terminal is vulnerable to conflict and congestion, or vulnerable to loopholes and resource waste, so that the resource allocation method of the LTE system cannot be well compatible with that of the LTE-A system. Therefore, the embodiments of the present invention need to solve the problem of incompatibility between LTE-A and LTE when some PRBs in a carrier of the LTE-A system are unavailable to the LTE terminal.

Figure 6:
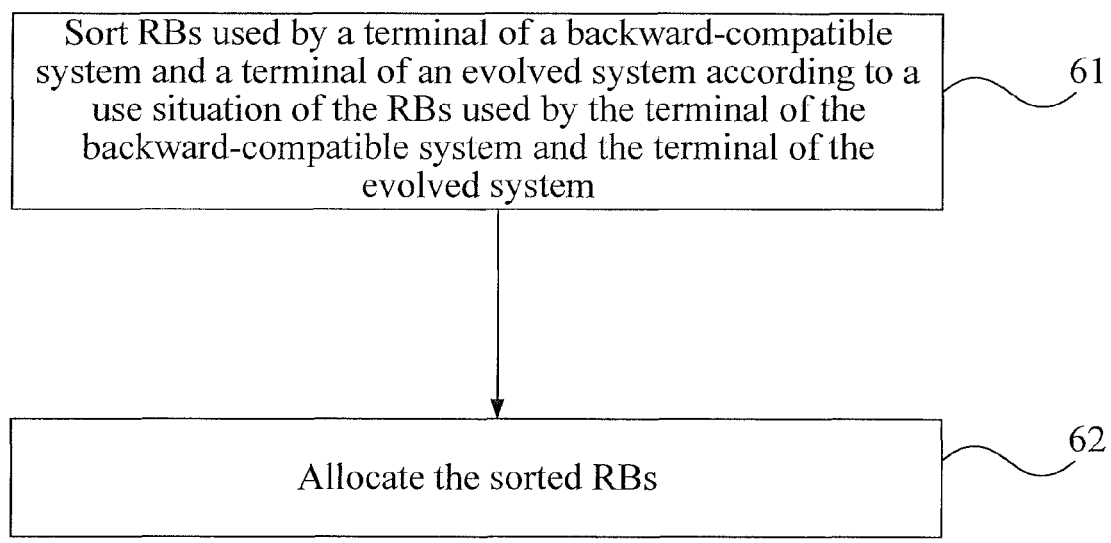
FIG. 6 is a schematic flowchart of a method according to a first embodiment of the present invention.

FIG. 6 is a schematic flowchart of a method according to a first embodiment of the present invention. The method includes the following steps.

Step 61: A network device sorts RBs used by a terminal of a backward-compatible system and a terminal of an evolved system according to a use situation of the RBs used by the terminal of the backward-compatible system and the terminal of the evolved system.

Step 62: The network device allocates the sorted RBs.

The backward-compatible system may be known as a first system, for example, an LTE system; and the evolved system may be known as a second system, for example, an LTE-A system. As described above, the second system a system evolving from the first system and is capable of providing a communication service for the terminal of the first system.

Specifically, it is still assumed that a carrier of LTE-A is composed of 18 PRBs, and the sequence numbers of the PRBs are sequentially defined as 0, 1, 2, . . . , and 17, which include part A, part $B_1$, and part $B_2$. Part A is available to both an LTE terminal and an LTE-A terminal, and is composed of 12 PRBs, and the sequence numbers corresponding to the PRBs are 3, 4, . . . , and 14; part $B_1$ and part $B_2$ are available to the LTE-A terminal but unavailable to the LTE terminal; part $B_1$ includes 3 PRBs, and part $B_2$ also includes 3 PRBs; the sequence numbers of the PRBs included by part $B_1$ are 0, 1, and 2, and the sequence numbers of the PRBs included by part $B_2$ are 15, 16, and 17. As shown in Table 1, an RBG is composed of 2 PRBs in both the LTE-A system and the LTE system.

To solve the foregoing problem of incompatibility between the LTE-A system and the LTE system, this embodiment of the present invention provides two types of PRB sorting according to the use situation of the PRBs used by the LTE-A terminal and the LTE terminal. The first type of PRB sorting is: The sorting starts from the public part of the LTE-A terminal and the LTE terminal; the starting sequence numbers of the LTE-A terminal and the LTE terminal are the same, so as to prevent the problem that the PRBs of the LTE-A terminal cannot be well aligned with the PRBs of the LTE terminal due to different starting sequence numbers so that the LTE-A is incompatible with the LTE. The second type of PRB sorting is: The PRBs of the LTE-A terminal and the PRBs of the LTE terminal are sorted separately, and the compatibility between the LTE-A system and the LTE system is ensured in the public part of the LTE-A system and the LTE system, and specifically, for RA type0 and RA type1, the RBG of the LTE-A terminal and the RBG of the LTE terminal have the same starting location in the public part, or the RBG of the LTE-A terminal just covers the RBG of the LTE terminal. The sorting method which starts from the public part is applicable to DL RA type0 mode, DL RA type1 mode, DL RA type2 DVRB mode, and UL hopping mode; and the sorting method performed for LTE-A and LTE separately is applicable to all UL and DL resource allocation modes, namely, applicable to DL RA type0 mode, DL RA type1 mode, DL RA type2 LVRB mode, DL RA type2 DVRB mode, UL no hopping mode, and UL hopping mode so long as the border between area A, area $B_1$, and area $B_2$ needs to satisfy the compatibility requirement, and so long as the VRB-to-PRB mapping of the resources does not conflict between the LTE terminal and the LTE-A terminal in the DVRB mode and the hopping mode. The following gives more details.

In the case that the sorting starts from the public part of the LTE-A terminal and the LTE terminal:

(1) DL RA Type0

Figure 7:
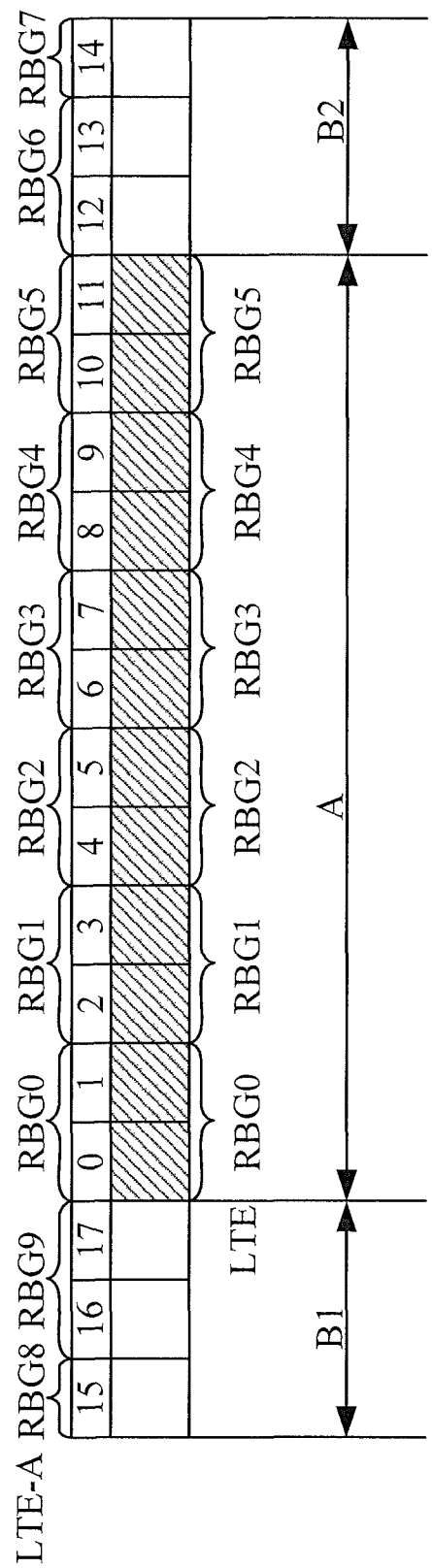
FIG. 7 is a schematic diagram of a resource allocation method in an RA type0 mode in a DL according to a second embodiment of the present invention.

For 18 PRBs used by the LTE-A terminal, the PRBs are sorted again in the sequence from part A to part $B_2$ and part $B_1$. Therefore, in area A, the sequence numbers of all PRBs of the LTE terminal are the same as those of the LTE-A terminal, and no PRB is congested. After the PRBs are sorted again, the size of the RBG in the LTE-A system may be determined in the following modes:

Mode 1: FIG. 7 is a schematic diagram of a resource allocation method in an RA type0 mode in a DL according to a second embodiment of the present invention. As shown in FIG. 7, the size of the RBG in the public part in the LTE-A system depends on the number of PRBs included in area A (namely, the public part of the LTE terminal and the LTE-A terminal), and specifically, depends on the relation between the total number of PRBs and the granularity in Table 1. As shown in Table 1, the size of an RBG is 2 in both the LTE-A system and the LTE system. Besides, for the dedicated part of LTE-A, the size of an RBG may be self-defined.

Figure 8:
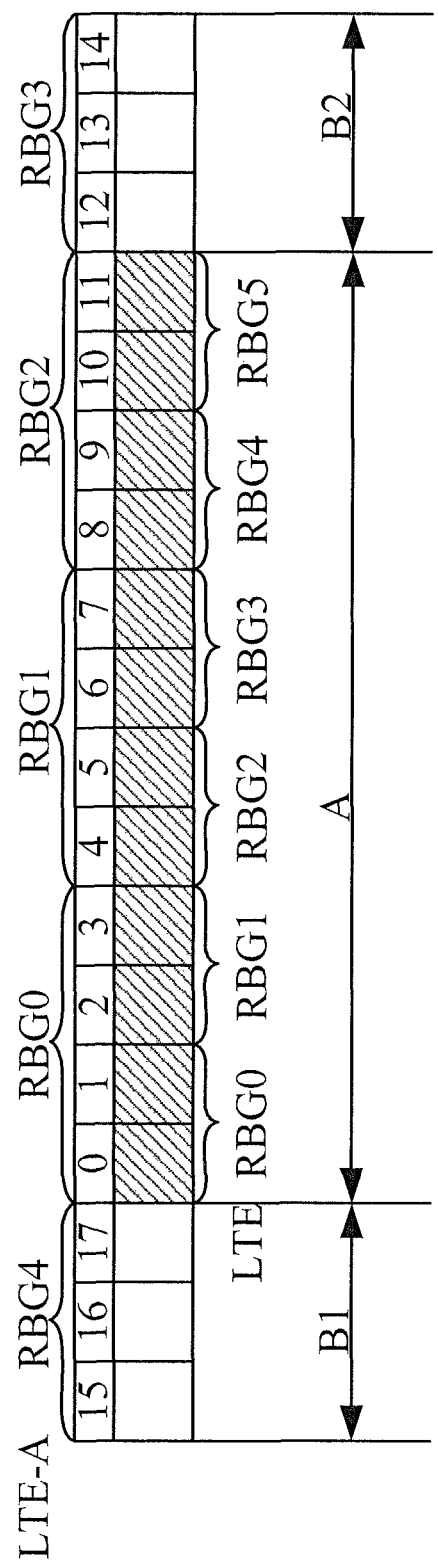
FIG. 8 is a schematic diagram of a resource allocation method in an RA type0 mode in a DL according to a third embodiment of the present invention.

Mode 2: FIG. 8 is a schematic diagram of a resource allocation method in an RA type0 mode in a DL according to a third embodiment of the present invention. As shown in FIG. 8, the size of an RBG in the public part in the LTE-A system is integer times (such as two times) of the size of an RBG in the LTE system. Besides, for the dedicated part of LTE-A, the size of an RBG may be self-defined. As shown in FIG. 8, in area A, the size of an RBG in the LTE system is 2, and the size of an RBG in the LTE-A system is 4; in part $B_2$ and part $B_1$, the size of an RBG in the LTE-A system is 3.

Figure 9:
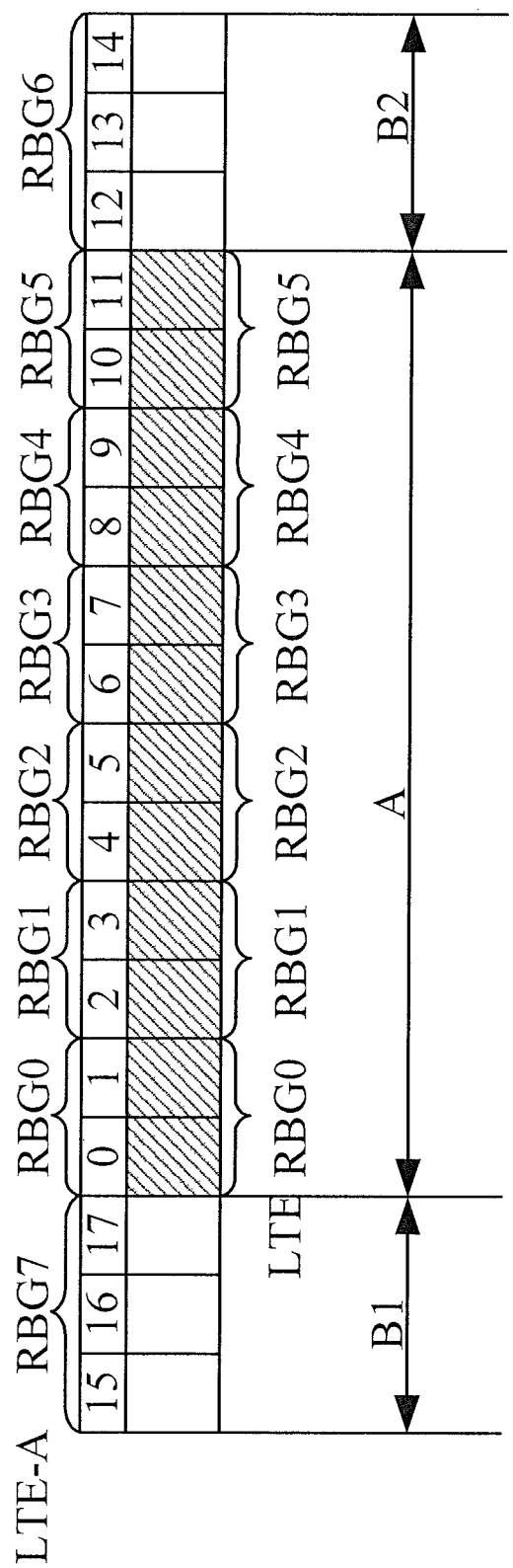
FIG. 9 is a schematic diagram of a resource allocation method in an RA type0 mode in a DL according to a fourth embodiment of the present invention.

Mode 3: FIG. 9 is a schematic diagram of a resource allocation method in an RA type0 mode in a DL according to a fourth embodiment of the present invention. As shown in FIG. 9, in the public part (area A) of the LTE terminal and the LTE-A terminal, the size of an RBG in the LTE-A system is the same as that of an LTE system; however, for area $B_1$ and area $B_2$ which are dedicated to LTE-A, the size of an RBG may be self-defined.

For the three modes above, the dedicated part is self-defined, which prevents some RBs in area $B_2$ and area $B_1$ from combining into an RBG. For example, if the dedicated part is not self-defined, because PRB14 in area $B_2$ and PRB15 in area $B_1$ have adjacent sequence numbers, PRB14 and PRB15 tend to be arranged into one RBG; however, because PRB14 is physically separated from PRB15, the channel quality of area $B_2$ is sharply different from the channel quality of area $B_1$, there is low possibility that PRB14 and PRB15 are both allocated simultaneously and area $B_2$ and area $B_1$ need to be defined separately. The self-defining method may be: As shown in FIG. 8 and FIG. 9, when area B2 and area B1 include few RBs, 1 RBG may be defined for area $B_2$ and area $B_1$ each. Alternatively, if area $B_2$ and area $B_1$ include an RBG which is as large as an RBG in area A, the remaining RBGs include more or less RBs than this RBG. For example, as shown in FIG. 7, RBG9 is as large as the RBG of area A, and RBG8 includes less RBs than RBG9.

The foregoing solution achieves compatibility between the LTE-A system and the LTE system in the RA type0 mode by sorting the RBs again.

(2) DL RA Type1

Figure 10:
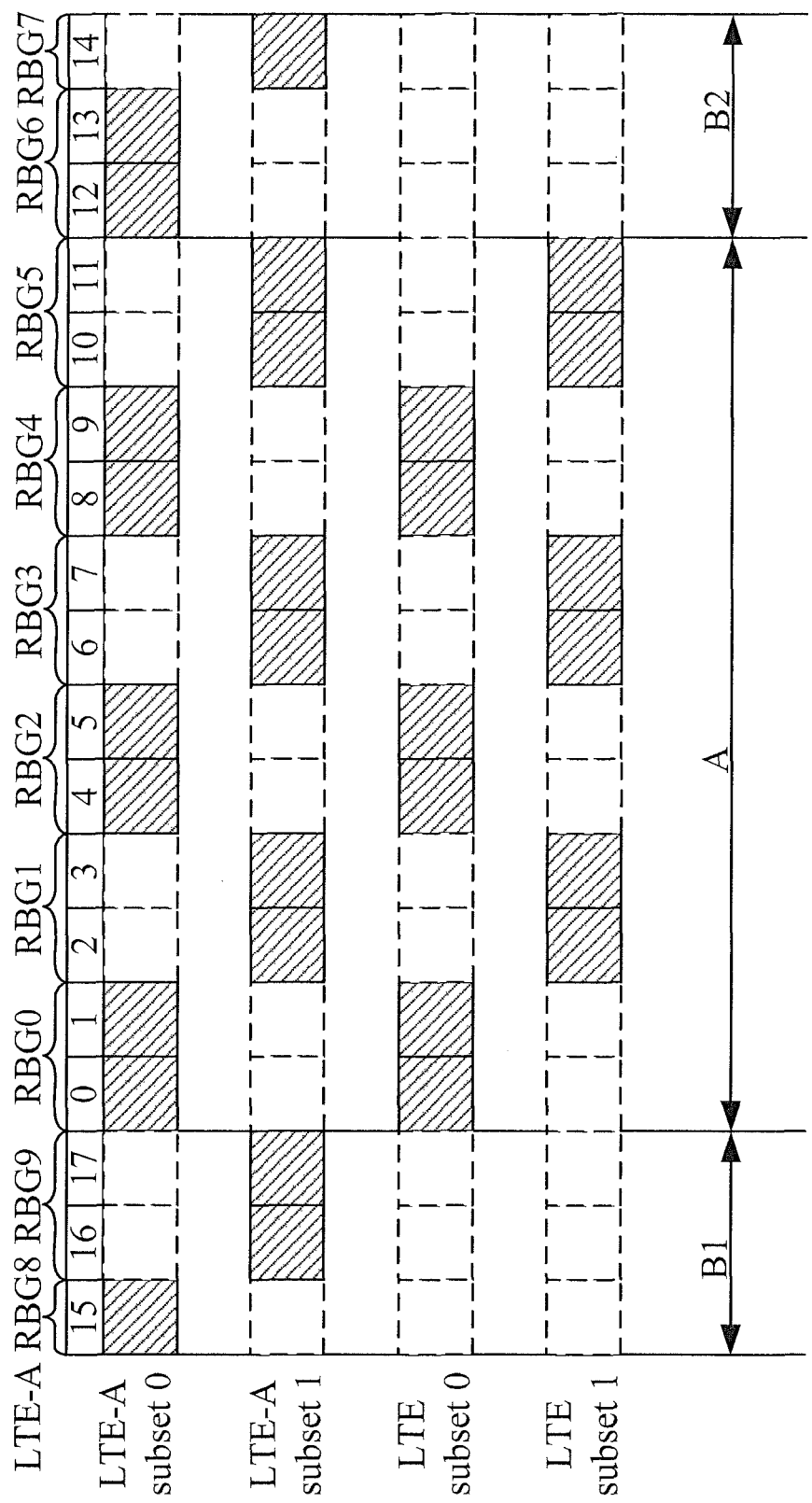
FIG. 10 is a schematic diagram of a resource allocation method in an RA type1 mode in a DL according to a fifth embodiment of the present invention.

For 18 RBs used by the LTE-A terminal, the RBs are sorted again in the sequence from part A to part $B_2$ and part $B_1$. Therefore, in area A, the sequence numbers of all RBs of the LTE terminal are the same as those of the LTE-A terminal, and no RB is congested. After the RBs are sorted again, the number of subsets in the LTE-A system and the number of RBs included in each subset may be determined in the following modes:

Mode 1 (corresponding to mode 1 of RA type0): FIG. 10 is a schematic diagram of a resource allocation method in an RA type1 mode in a DL according to a fifth embodiment of the present invention. As shown in FIG. 10, the number of RBG subsets in the LTE-A system depends on the number of RBs included in area A (namely, the public part of the LTE terminal and the LTE-A terminal), instead of depending on the number of all RBs included in the LTE-A system. As shown in Table 10, the number of RBG subsets in the LTE-A system is the same as that in the LTE system, namely, the both numbers are 2.

Figure 11:
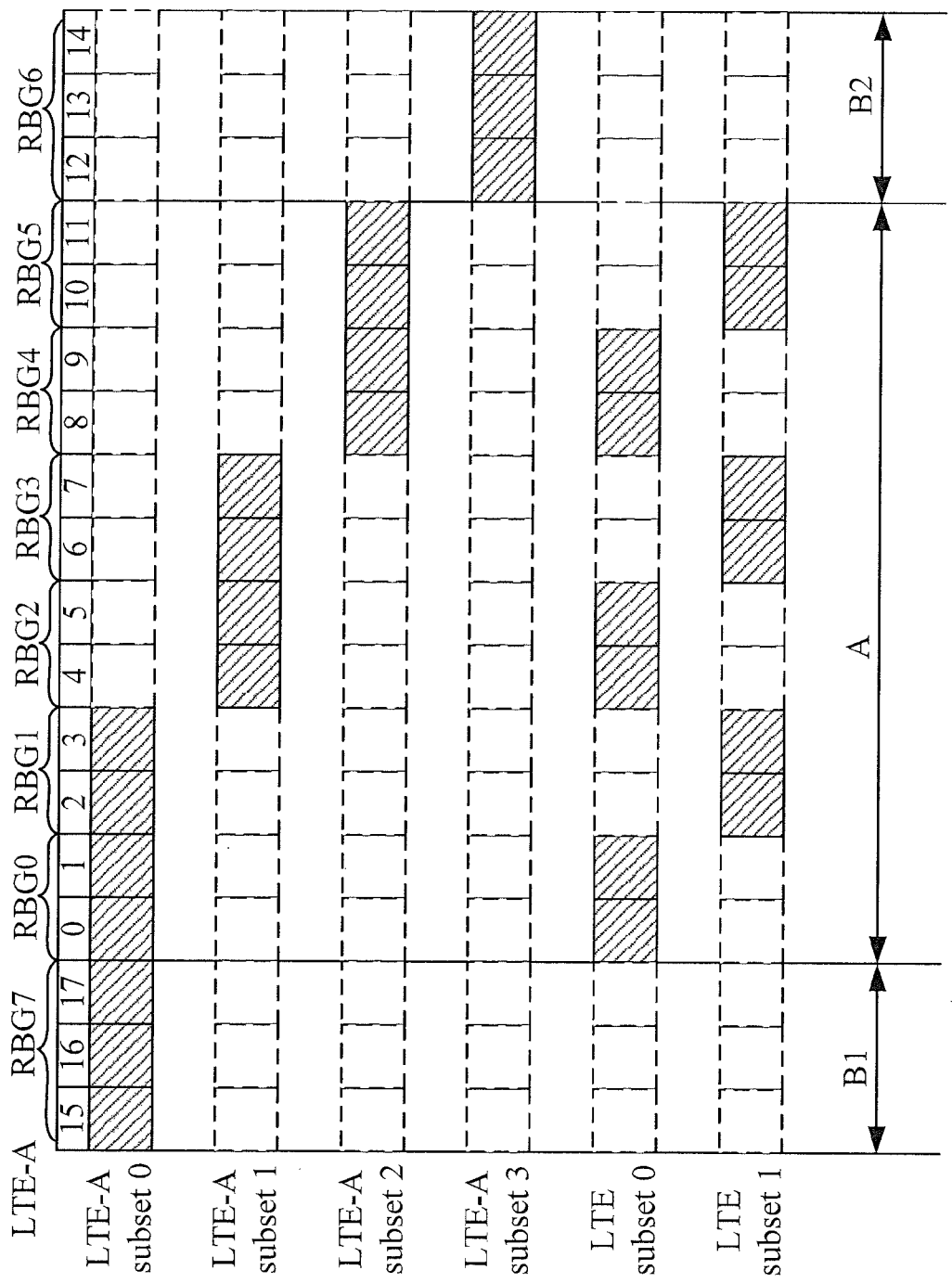
FIG. 11 is a schematic diagram of a resource allocation method in an RA type1 mode in a DL according to a sixth embodiment of the present invention.

Mode 2 (corresponding to mode 2 of RA type0): FIG. 11 is a schematic diagram of a resource allocation method in an RA type1 mode in a DL according to a sixth embodiment of the present invention. As shown in FIG. 11, the number of RBG subsets in the LTE-A system is integer times (such as 2 times) of that in the LTE system. Besides, in some circumstances, the size of the RBG in the subset needs to be self-defined in order to arrange the RBG subsets in the LTE system and the LTE-A system orderly. As shown in FIG. 11, the size of an RBG in part $B_2$ and part $B_1$ is 3, the RBG in part $B_2$ belongs to subset 3 of LTE-A, the RBG in part $B_1$ belongs to subset 0 of LTE-A, and the size of such RBG is unequal to the RBG size in other subsets.

Figure 12:
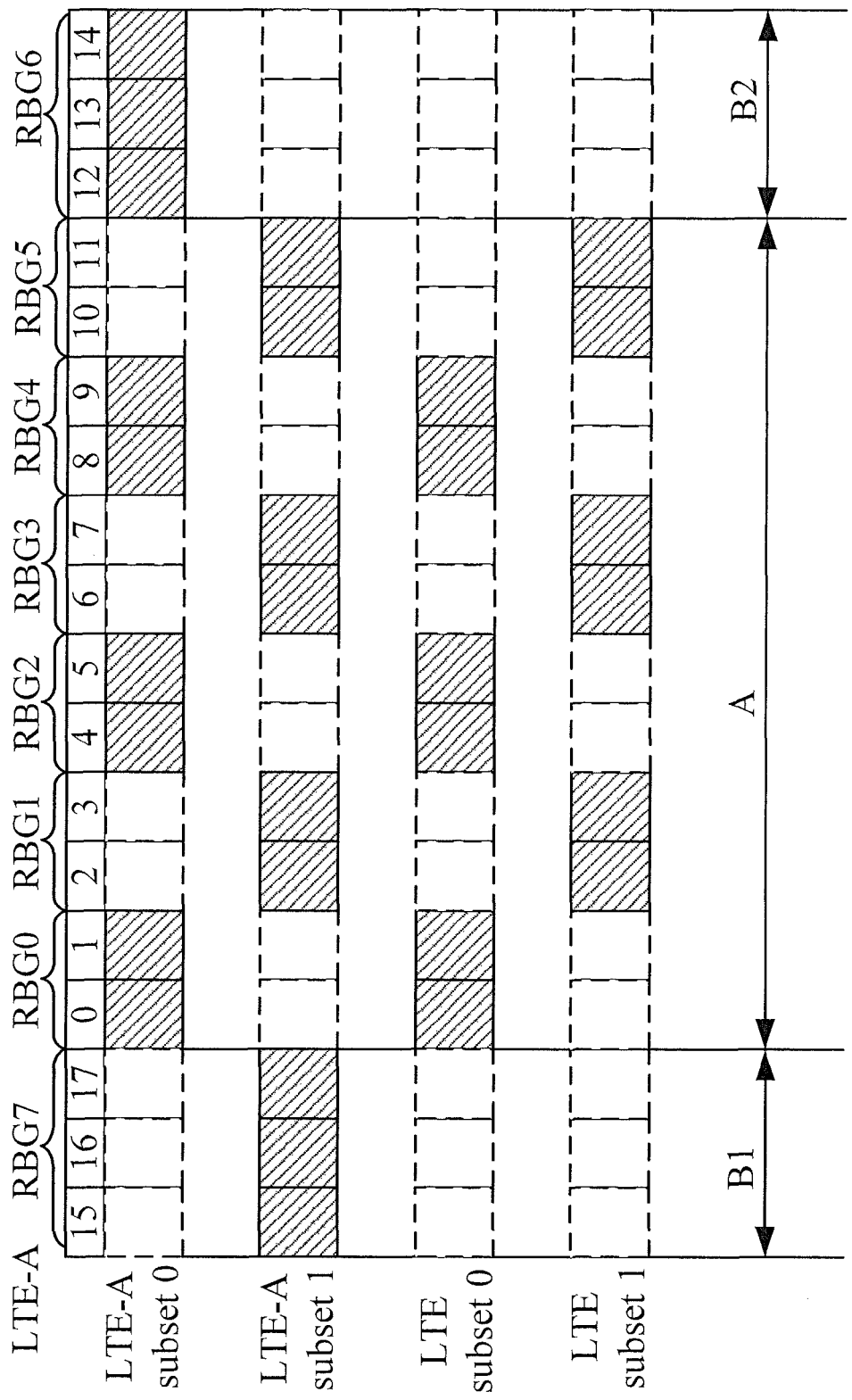
FIG. 12 is a schematic diagram of a resource allocation method in an RA type1 mode in a DL according to a seventh embodiment of the present invention.

Mode 3 (corresponding to mode 3 of RA type0): FIG. 12 is a schematic diagram of a resource allocation method in an RA type1 mode in a DL according to a seventh embodiment of the present invention. As shown in FIG. 12, in the public part (area A) of the LTE terminal and the LTE-A terminal, the number of RBG subsets in the LTE-A system is the same as that in the LTE system; in area A, each subset includes the same number of RBGs. However, for area $B_1$ and area $B_2$ which are dedicated to LTE-A, the size of an RBG may be self-defined. The self-defining method corresponding to RA type0 may be: As shown in FIG. 12, when area $B_2$ and area $B_1$ include few PRBs, 1 RBG may be defined for area $B_2$ and area $B_1$ each. Alternatively, if area $B_2$ and area $B_1$ include an RBG which is as large as an RBG in area A, the remaining RBGs include more or less RBs than this RBG in order to ensure that the RBG of LTE is aligned with the RBG of LTE-A in area A. For example, as shown in FIG. 10, RBG9 is as large as the RBG of area A, and RBG8 includes less RBs than RBG9.

The foregoing solution achieves compatibility between the LTE-A system and the LTE system in the RA type1 mode by sorting the PRBs again.

(3) DL RA Type2 DVRB

Figure 13:
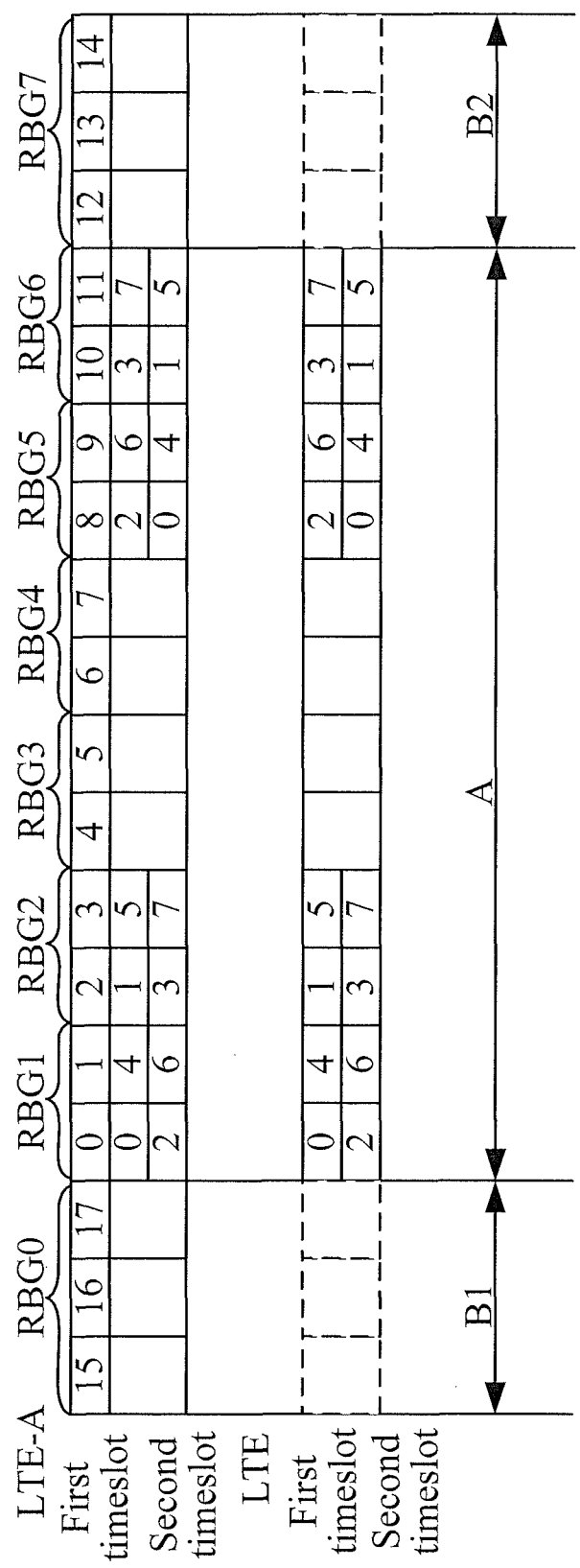
FIG. 13 is a schematic diagram of a resource allocation method in an RA type2 DVRB mode in a DL according to an eighth embodiment of the present invention.

FIG. 13 is a schematic diagram of a resource allocation method in an RA type2

DVRB mode in a DL according to an eighth embodiment of the present invention. As shown in FIG. 13, the PRBs of the LTE-A system are numbered sequentially from area A to area $B_2$ and area $B_1$ so that such PRBs are well aligned with the RBs of the LTE system and that the DVRB mode is allowed to occur only within the bandwidth range of area A. That is, for area $B_1$ and area $B_2$ which are dedicated to LTE-A, the DVRB resource allocation mode is not allowed to be adopted, but the LVRB mode and the RA type0/1 mode may be adopted for resource allocation, so as to ensure that the conflict and collision of VRB-to-PRB mapping is prevented between the LTE terminal and the LTE-A terminal in the RA type2 DVRB resource allocation mode.

(4) UL Hopping Mode

Figure 14:
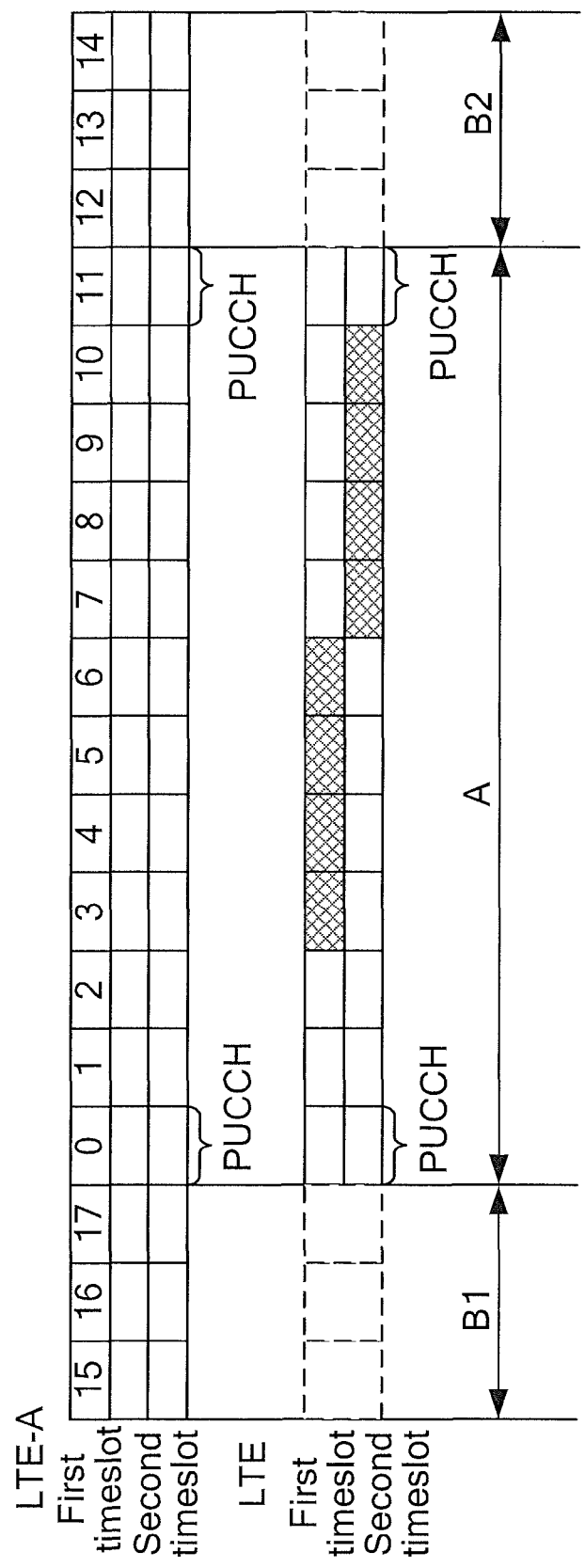
FIG. 14 is a schematic diagram of a resource allocation method in a hopping mode in a UL according to a ninth embodiment of the present invention.

FIG. 14 is a schematic diagram of a resource allocation method in a hopping mode in a UL according to a ninth embodiment of the present invention. As shown in FIG. 14, the PRBs of the LTE-A system are numbered sequentially from area A to area $B_2$ and area $B_1$ so that such PRBs are well aligned with the RBs of the LTE system and that the hopping mode predefined in UL hopping type1 and UL hopping type2 is allowed to occur only within the bandwidth range of area A. That is, for area $B_1$ and area $B_2$ which are dedicated to LTE-A, the hopping mode predefined in UL hopping type1 and UL hopping type2 is not allowed to be adopted, but the no hopping mode may be adopted for resource allocation, so as to ensure that the conflict and collision of VRB-to-PRB mapping is prevented between the LTE terminal and the LTE-A terminal.

In the foregoing solution, the PRBs of LTE-A are numbered sequentially from area A to area $B_2$ and area $B_1$, and then the corresponding resources are allocated.

Furthermore, another solution is to number the resources available to the LTE-A terminal and the resources available to the LTE terminal separately, and then allocate corresponding resources. This solution includes:

(1) DL RA Type0

Figure 15:
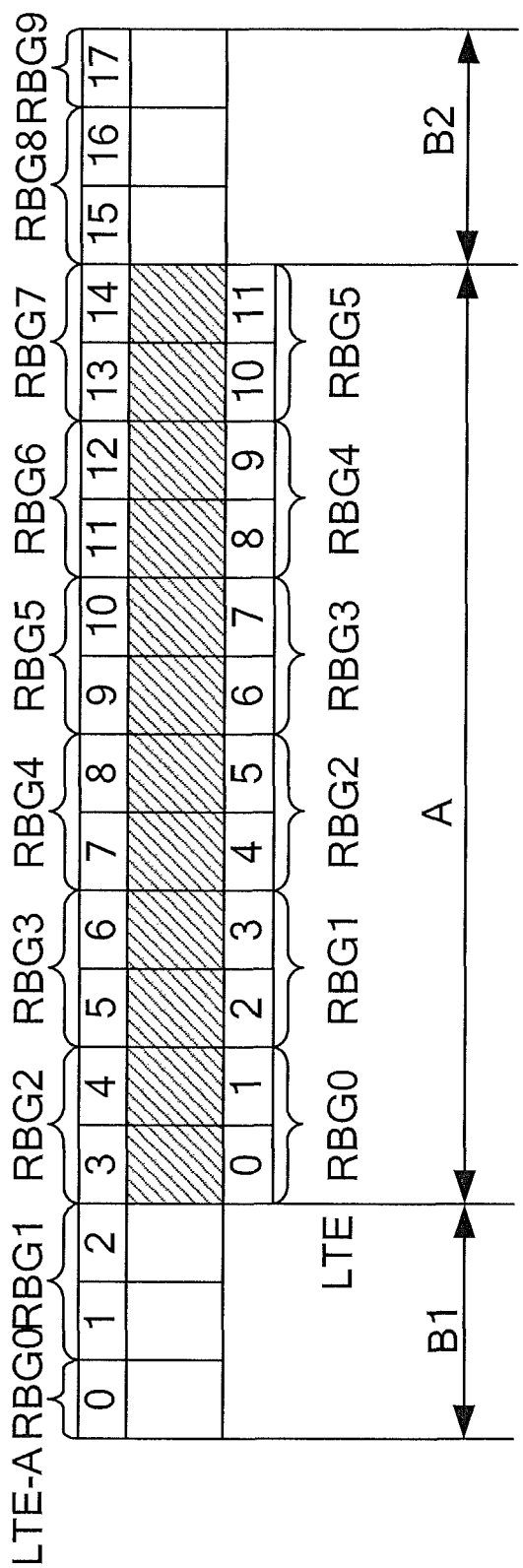
FIG. 15 is a schematic diagram of a resource allocation method in an RA type0 mode in a DL according to a tenth embodiment of the present invention.

FIG. 15 is a schematic diagram of a resource allocation method in an RA type0 mode in a DL according to a tenth embodiment of the present invention.

As shown in FIG. 15, for LTE-A, the PRBs available to the LTE-A terminal are numbered according to sequence numbers from 0 to 17; for LTE, the PRBs available to the LTE terminal are numbered according to sequence numbers from 0 to 11. Moreover, to ensure compatibility between LTE-A and LTE, the RBGs of LTE-A need to be aligned with the RBGs of LTE in the public part. Therefore, the size of an RBG in the dedicated part of LTE-A may be different. For example, as shown in FIG. 15, the size of RBG0 in LTE-A is 1, but the size of RBG1 in LTE-A is 2. The specific method of determining the size of an RBG may one of the three methods described in the foregoing embodiment of DL RA type0, in which the sorting starts from the public part. For example, the method of determining the size of an RBG is shown in FIGS. 7 to 9, and is not repeated herein.

(2) DL RA Type1

Figure 16:
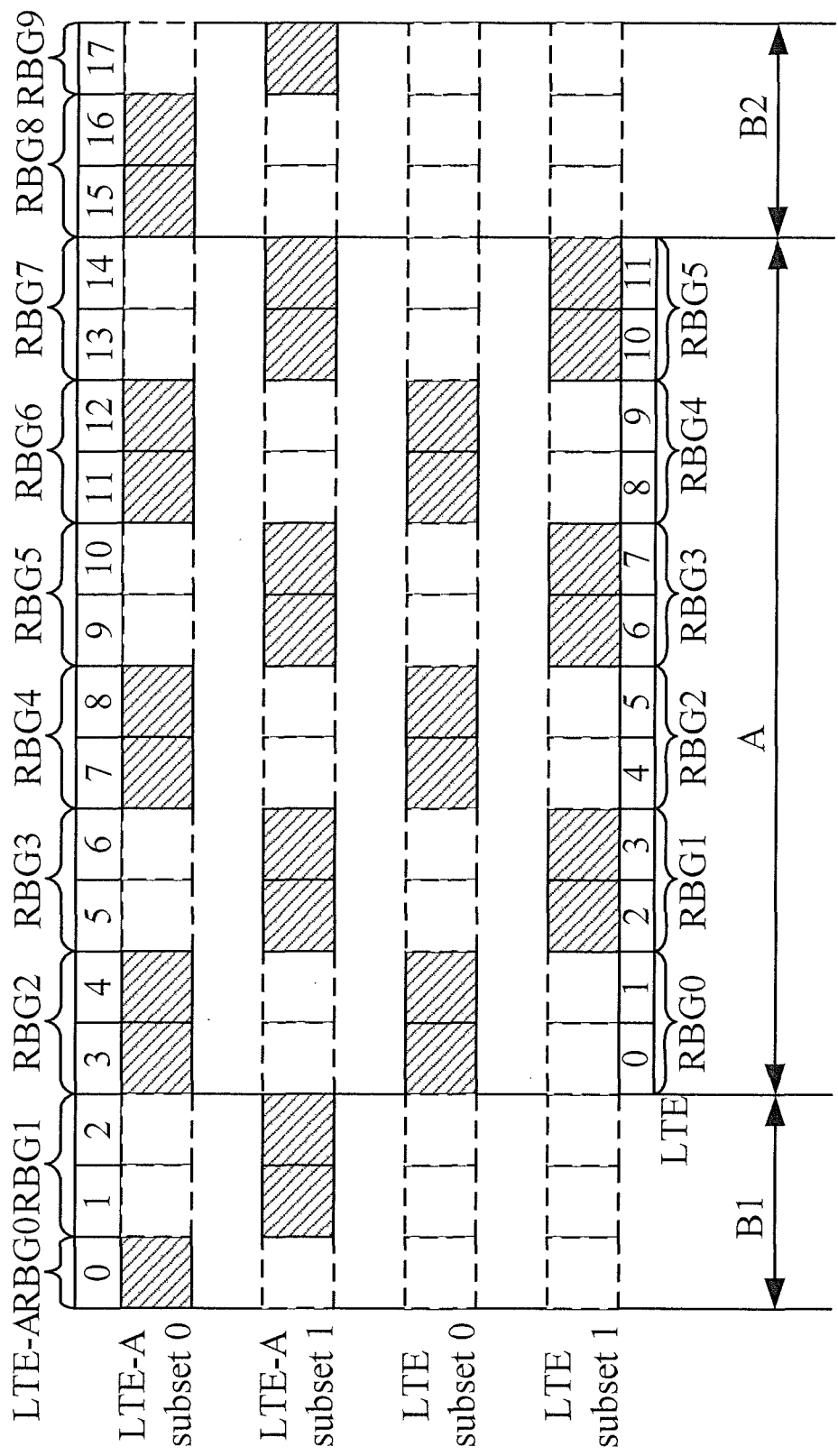
FIG. 16 is a schematic diagram of a resource allocation method in an RA type1 mode in a DL in according to eleventh embodiment of the present invention.

FIG. 16 is a schematic diagram of a resource allocation method in an RA type1 mode in a DL according to an eleventh embodiment of the present invention. As shown in FIG. 16, for LTE-A, the RBs available to the LTE-A terminal are numbered according to sequence numbers from 0 to 17; for LTE, the RBs available to the LTE terminal are numbered according to sequence numbers from 0 to 11. Moreover, to ensure compatibility between LTE-A and LTE, the RBG subsets of LTE-A need to be aligned with the RBG subsets of LTE in the public part. Therefore, the size of an RBG in the dedicated part of LTE-A may be different. For example, as shown in FIG. 16, the size of RBG0 included in RBG subset 0 in LTE-A is 1, but the size of RBG9 included in RBG subset 1 in LTE-A is 1. The specific method of determining the size of an RBG and the corresponding RBG subset may one of the three methods described in the foregoing embodiment of DL RA type1, in which the sorting starts from the public part. For example, the method of determining the size of an RBG and the RBG subset is shown in FIGS. 10 to 12, and is not repeated herein.

(3) DL RA Type2 LVRB

Figure 17:
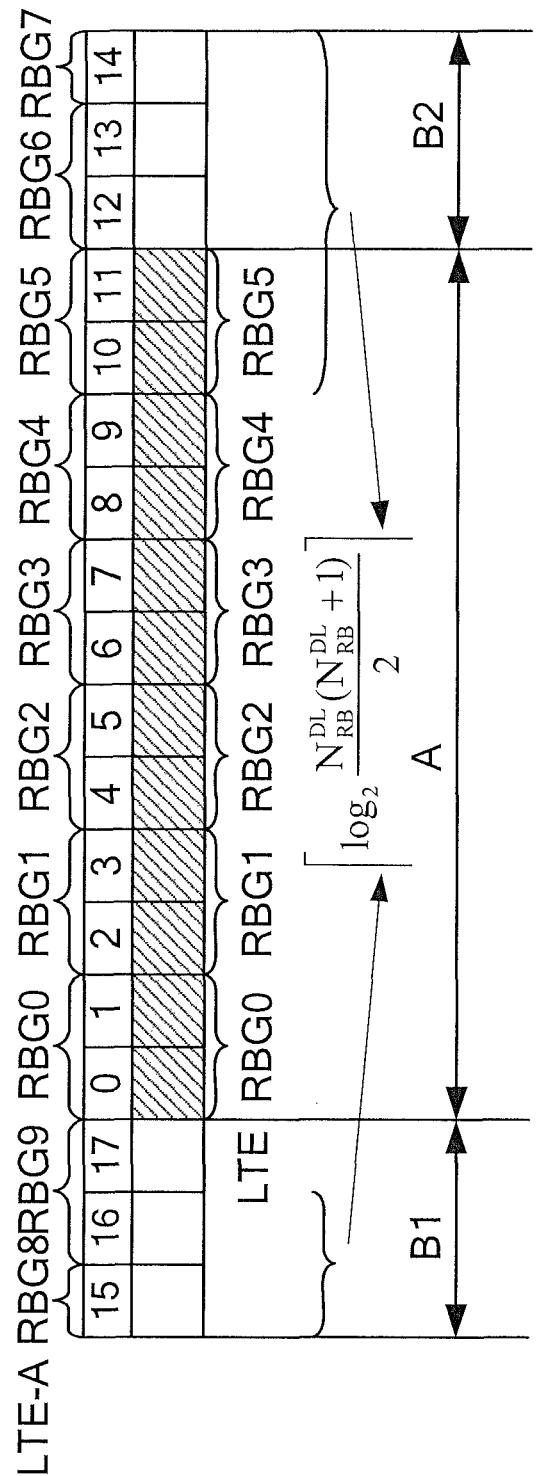
FIG. 17 is a schematic diagram of a resource allocation method in an RA type2 LVRB mode in a DL according to a twelfth embodiment of the present invention.

For DL RA type2 LVRB, as regards the 18 PRBs used by the LTE-A terminal, if the RA type 2 LVRB is similar to RA type 0/1 in that PRBs are numbered sequentially from area A to area $B_2$ and area $B_1$, all PRBs can be allocated to the LTE-A terminal. FIG. 17 is a schematic diagram of a resource allocation method in an RA type2 LVRB mode in a DL according to a twelfth embodiment of the present invention. As shown in FIG. 17, when 7 continuous PRBs of VRB10 to VRB16 are allocated to the LTE-A terminal, the corresponding PRB10 to PRB16 have different sequence numbers which make the physical resources no longer continuous. If such resources are still allocated to the terminal, the terminal measurement and CQI are more complex, signaling overhead is increased, or the CQI information of the whole bandwidth is reported frequently; if such resources are not allocated to the terminal, the inaccurate scheduling is caused, so as to affect performance of data transmission.

Figure 18:
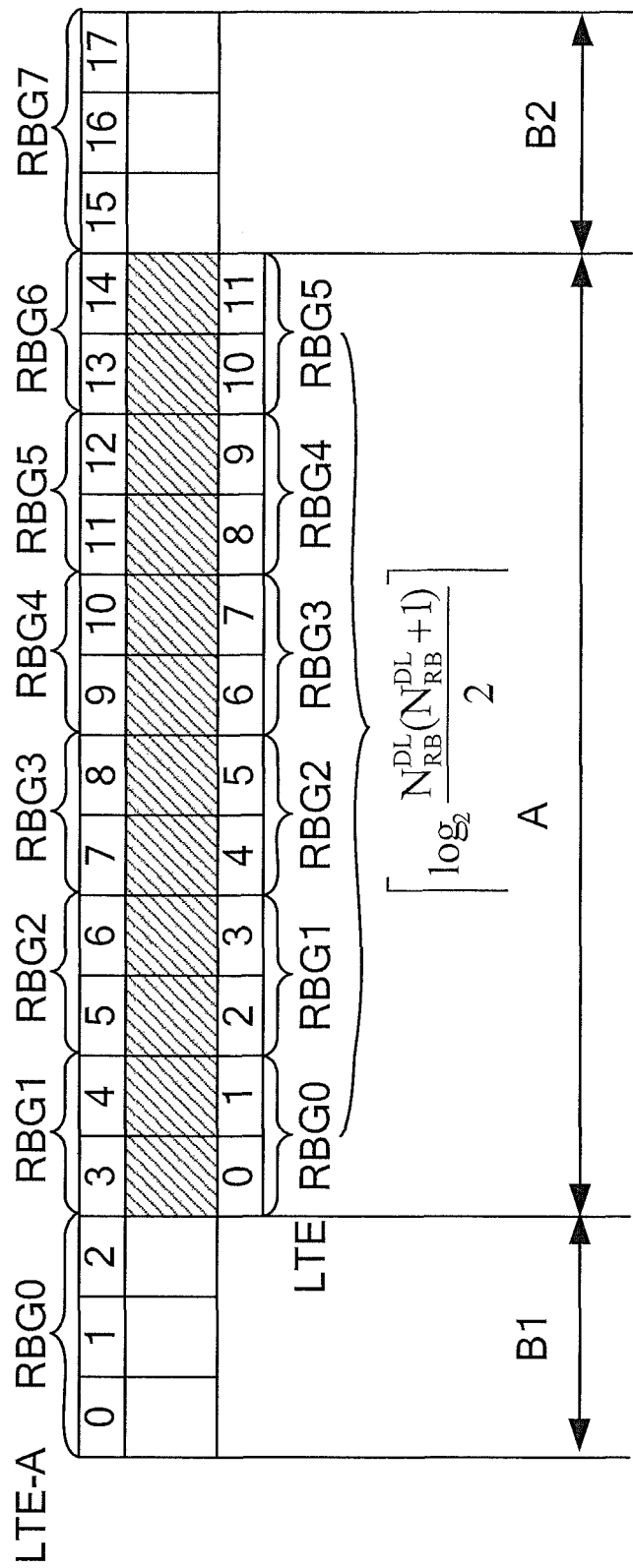
FIG. 18 is a schematic diagram of a resource allocation method in an RA type2 LVRB mode in a DL according to a thirteenth embodiment of the present invention.

To solve such problems, the foregoing method may be applied to numbering in RA type0 and RA type1. FIG. 18 is a schematic diagram of a resource allocation method in an RA type2 LVRB mode in a DL according to a thirteenth embodiment of the present invention. The normal sequence shown in FIG. 18 may be applied to numbering in RA type 2 LVRB. Therefore, all PRBs corresponding to LTE and LTE-A are physically continuous. Moreover, at the time of allocating RBGs to $B_1$ in LTE-A shown in FIG. 18, to ensure alignment of RBGs between LTE-A and LTE in the public part, $B_1$ may be divided into two RBGs. One RBG includes 1 RB, and the other RBG includes 2 RBs. Definitely, as shown in FIG. 12, $B_1$ is directly divided into 1 RBG which includes 3 RBs. The specific allocation method for $B_1$ is similar to the foregoing description, and is not repeated here any further.

(4) DL RA Type2 DVRB

Figure 19:
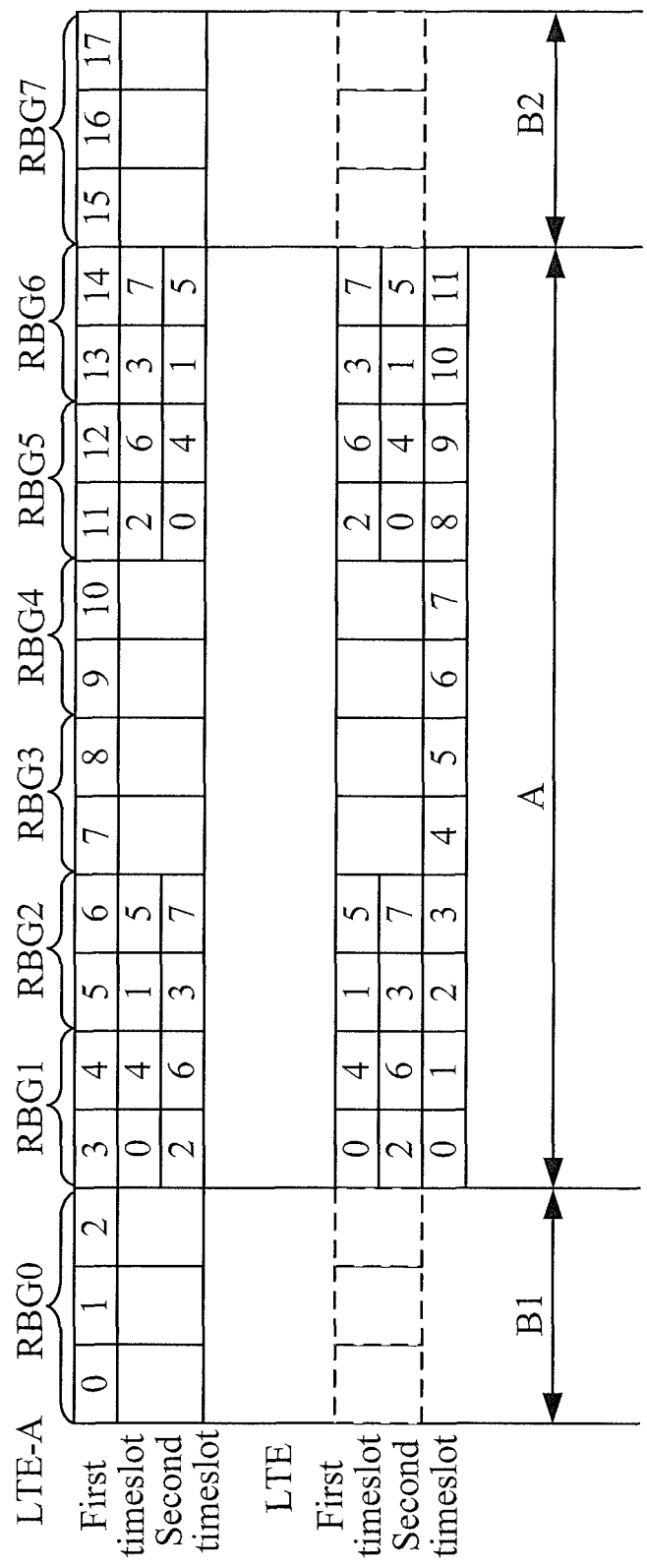
FIG. 19 is a schematic diagram of a resource allocation method in an RA type2 DVRB mode in a DL according to a fourteenth embodiment of the present invention.

FIG. 19 is a schematic diagram of a resource allocation method in an RA type2 DVRB mode in a DL according to a fourteenth embodiment of the present invention. As shown in FIG. 19, for LTE-A, the PRBs available to the LTE-A terminal are numbered according to sequence numbers from 0 to 17; for LTE, the PRBs available to the LTE terminal are numbered according to sequence numbers from 0 to 11. Moreover, for LTE-A, the DVRB resource allocation method is applicable only to the public part of the LTE-A terminal and the LTE terminal. That is, the DVRB resource allocation method is supported only in area A, but not allowed to be adopted in area $B_1$ and area $B_2$ which are dedicated to LTE-A. The practice of allowing the RA type2 DVRB mode to occur only in the bandwidth range of area A is applicable to both the method of numbering which starts from the public part and the method which performs numbering for LTE-A and LTE separately.

(5) UL No Hopping Mode

Similar to the DL RA type2 LVRB resource allocation method, this method indicates the starting VRB sequence number and the number of continuous VRBs allocated. The VRB sequence number corresponds to the PRB sequence number one-to-one. This method is similar to the RA type2 LVRB method, faces the same problem, and is not repeated here any further.

Similar to the DL RA type2 LVRB resource allocation method, this method indicates the starting VRB sequence number and the number of continuous VRBs allocated. The VRB sequence number corresponds to the PRB sequence number one-to-one. Under this mode, the method of RA type2 LVRB is applicable, different RB sequence numbers only need to be defined for the LTE terminal and the LTE-A terminal separately, and the method is not repeated herein.

(6) UL Hopping Mode

For the predefined mode in type1 and type2 of the foregoing UL hopping mode, the method in which the numbering starts from the public part is adopted. Definitely, numbering for LTE-A and LTE may be also performed separately. The following description takes the mirror hopping mode as an example.

Figure 20:
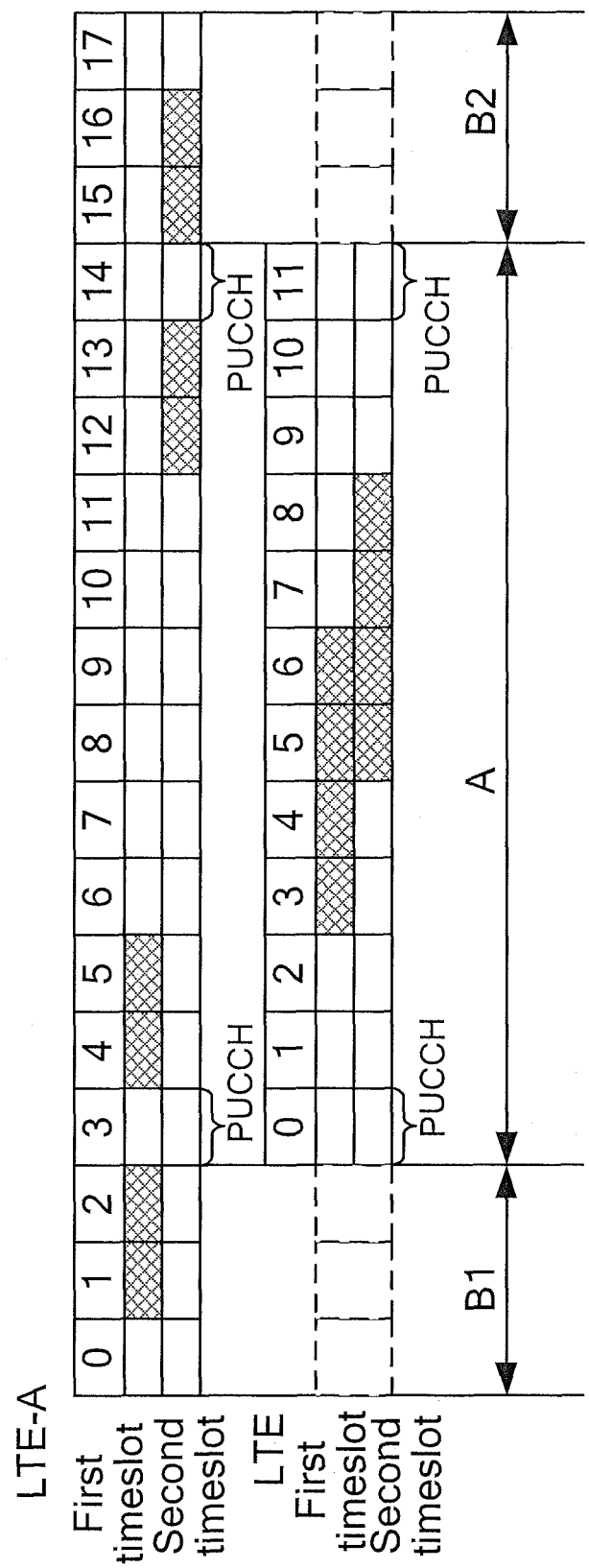
FIG. 20 is a schematic diagram of a resource allocation method in a mirror hopping mode in a UL according to a fifteenth embodiment of the present invention.

The LTE RBs and the LTE-A RBs may be numbered differently to support the mirror hopping mode. FIG. 20 is a schematic diagram of a resource allocation method in a mirror hopping mode in a UL according to a fifteenth embodiment of the present invention. As shown in FIG. 20, for LTE-A, the PRBs available to the LTE-A terminal are numbered according to sequence numbers from 0 to 17; for LTE, the PRBs available to the LTE terminal are numbered according to sequence numbers from 0 to 11. This method maintains compatibility of resource allocation between LTE and LTE-A.

However, the hopping mode predefined in UL hopping type1 and UL hopping type2 is allowed to occur only within the bandwidth range of area A. That is, for area $B_1$ and area $B_2$ which are dedicated to LTE-A, the hopping mode predefined in UL hopping type1 and UL hopping type2 is not allowed to be adopted for resource allocation, but the no hopping mode may be adopted for resource allocation, so as to ensure that the conflict and collision of VRB-to-PRB mapping is prevented between the LTE terminal and the LTE-A terminal. As regards the hopping mode predefined in UL hopping type1 and UL hopping type2, the practice of allowing the hopping mode to occur only in the bandwidth range of area A is applicable to both the method of numbering which starts from the public part and the method which performs numbering for LTE-A and LTE separately.

This embodiment takes account of the use situation of PRBs used by the LTE-A terminal and the LTE terminal and performs resource allocation, so as to ensure compatibility between LTE-A and LTE.

Figure 21:
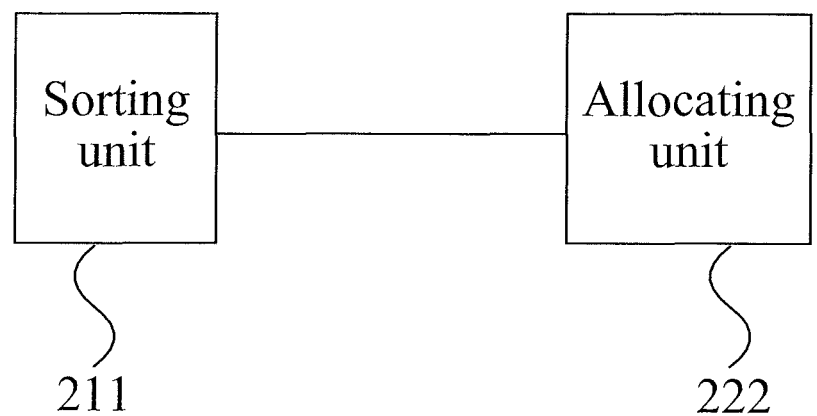
FIG. 21 is a schematic structural diagram of a device according to a sixteenth embodiment of the present invention.

FIG. 21 is a schematic structural diagram of a device according to a sixteenth embodiment of the present invention. The device includes a sorting unit 211 and an allocating unit 212. The sorting unit 211 is configured to sort RBs of a backward-compatible system and an evolved system according to a use situation of the RBs used in the backward-compatible system and the evolved system. The allocating unit 212 is configured to allocate the sorted RBs obtained by the sorting unit 211. As mentioned above, the backward-compatible system is also known as a first system, and the evolved system is also known as a second system, which also applies in the following and is not repeated.

The sorting unit 211 is specifically configured to sort the RBs of the backward-compatible system and the evolved system uniformly, where the sorting starts from a public RB of the backward-compatible system and the evolved system. The allocating unit 212 is specifically configured to allocate the RBs of the backward-compatible system in the DL RA type0 mode, DL RA type1 mode, DL RA type2 LVRB mode, DL RA type2 DVRB mode, UL no hopping mode, or UL hopping mode. Alternatively, the allocating unit 212 is specifically configured to allocate the RBs in the public part of the evolved system and the backward-compatible system in the DL RA type2 DVRB mode or UL hopping mode. Alternatively, the allocating unit 212 is specifically configured to allocate all RBs of the evolved system in the DL RA type0 mode or DL RA type1 mode.

Alternatively, the sorting unit 211 is specifically configured to sort the RBs of the backward-compatible system and the RBs of the evolved system separately. The allocating unit 212 is specifically configured to allocate the RBs of the backward-compatible system in the DL RA type0 mode, DL RA type1 mode, DL RA type2 LVRB mode, DL RA type2 DVRB mode, UL no hopping mode, or UL hopping mode; or allocate the RBs of the evolved system in the DL RA type0 mode, DL RA type1 mode, DL RA type2 LVRB mode, DL RA type2 DVRB mode, UL no hopping mode, or UL hopping mode.

Specifically, the sorting unit 211 and the allocating unit 212 can further implement various sorting and allocation functions mentioned in the foregoing methods, and the details are not repeated.

This embodiment takes account of the use situation of PRBs used by the LTE-A terminal and the LTE terminal and performs resource allocation, so as to ensure compatibility between LTE-A and LTE.

Further, an embodiment of the present invention provides a wireless system. The wireless system includes a network device, which is configured to sort RBs of a backward-compatible system and an evolved system according to a use situation of the RBs used by the backward-compatible system and the evolved system, and allocate the sorted RBs. For more details of the network device, see FIG. 21. This embodiment takes account of the use situation of PRBs used by the LTE-A terminal and the LTE terminal and performs resource allocation, so as to ensure compatibility between LTE-A and LTE.

Persons of ordinary skill in the art should understand that all or a part of the steps of the method according to the embodiments of the present invention may be implemented by a program instructing relevant hardware. The program may be stored in a computer readable storage medium. When the program runs, the program executes the steps of the method specified in any embodiment of the present invention. The storage medium may be any medium that is capable of storing program codes, such as Read-Only Memory (ROM), Random Access Memory (RAM), magnetic disk, or optical disk.

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A resource allocation method, comprising:
   sorting Resource Blocks (RBs) used by a terminal of a first system and a terminal of a second system according to a use situation of the RBs used by the terminal of the first system and the terminal of the second system; and
   allocating the sorted RBs, wherein
   the second system is a system which is evolved from the first system and is capable of providing a communication service for terminals of the first system,
   wherein: the sorting the RBs used by the terminal of the first system and the terminal of the second system comprises:
   sorting the RBs used by the terminal of the first system and the terminal of the second system, wherein the sorting starts from a public RB of the terminal of the first system and the terminal of the second system,
   wherein: the allocating the sorted RBs comprises one of the following operations:
   the first operation:
   allocating continuous Physical Resource Blocks (PRBs) to the terminal of the second system by using a downlink (DL) Resource Allocation (RA) type2 Localized Virtual Resource Block (LVRB) mode or uplink (UL) no hopping mode; and
   allocating the public RB to the terminal of the second system by using a DL RA type2 Distributed Virtual Resource Block (DVRB) mode or UL hopping mode,
   the second operation:
   allocating the public RB of a terminal of a backward-compatible system and a terminal of an evolved system to the terminal of the backward-compatible system or the terminal of the evolved system by using a downlink (DL) Resource Allocation (RA) type0 mode, DL RA type1 mode, DL RA type2 mode, uplink (UL) no hopping mode, or UL hopping mode; and/or
   allocating a dedicated RB of the terminal of the evolved system to the terminal of the evolved system by using a DL RA type0 mode, DL RA type1 mode, UL no hopping mode, or UL mirror hopping mode;
   wherein the backward-compatible system is the first system, and the evolved system is the second system,
   wherein: the allocating the public RB of the terminal of the first system and the terminal of the second system to the terminal of the second system by using the DL RA type0 mode comprises:
   dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs; and
   allocating each RBG to the terminal of the second system by using a bitmap mode,
   the third operation:
   allocating the public RB of a terminal of a backward-compatible system and a terminal of an evolved system to the terminal of the backward-compatible system or the terminal of the evolved system by using a downlink (DL) Resource Allocation (RA) type0 mode, DL RA type1 mode, DL RA type2 mode, uplink (UL) no hopping mode, or UL hopping mode; and/or
   allocating a dedicated RB of the terminal of the evolved system to the terminal of the evolved system by using a DL RA type0 mode, DL RA type1 mode, UL no hopping mode, or UL mirror hopping mode;
   wherein the backward-compatible system is the first system, and the evolved system is the second system,
   wherein: the allocating the public RB of the terminal of the first system and the terminal of the second system to the terminal of the second system by using the DL RA type1 mode comprises:
   dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs;
   dividing the RBGs into RBG subsets, wherein the number of the RBG subsets is the same as the resource allocation granularity or integer times of the resource allocation granularity; and
   allocating RBs in each RBG subset to the terminal of the second system by using a bitmap mode.

2. The method according to claim 1, wherein: the allocating the dedicated RB of the second system to the terminal of the second system by using the DL RA type0 mode comprises:
   combining the dedicated RB into one or more Resource Block Groups (RBGs) according to dedicated parts of the dedicated RB, or dividing the dedicated RB into one or more RBGs according to resource allocation granularity of the terminal of the first system or integer times of the resource allocation granularity; and
   allocating each RBG to the terminal of the second system by using a bitmap mode.

3. The method according to claim 1, wherein: the allocating the dedicated RB of the second system to the terminal of the second system by using the DL RA type1 mode comprises:
   combining the dedicated RB into one or more Resource Block Groups (RBGs) according to the dedicated parts of the dedicated RB, or dividing the dedicated RB into one or more RBGs according to resource allocation granularity of the terminal of the first system or integer times of the resource allocation granularity;
   dividing the RBGs into RBG subsets, wherein the number of the RBG subsets is the same as the number of dedicated parts of the dedicated RB, the resource allocation granularity or integer times of the resource allocation granularity; and
   allocating RBs in each RBG subset to the terminal of the second system by using a bitmap mode.

4. The method according to claim 1, wherein:
   the RBs comprise a public RB of the terminal of the first system and the terminal of the second system, and a dedicated RB of the terminal of the second system, and a dedicated RB exists on at least side of the public RB.

5. A resource allocation method, comprising:
   sorting Resource Blocks (RBs) used by a terminal of a first system and a terminal of a second system according to a use situation of the RBs used by the terminal of the first system and the terminal of the second system; and
   allocating the sorted RBs, wherein
   the second system is a system which is evolved from the first system and is capable of providing a communication service for terminals of the first system,
   wherein: the sorting the RBs used by the terminal of the first system and the terminal of the second system comprises:

sorting RBs used by the terminal of the first system and sorting RBs used by the terminal of the second system separately, wherein: the allocating the sorted RBs comprises one of the following operations:

the first operation:

allocating continuous Physical Resource Blocks (PRBs) to the terminal of the second system by using a downlink (DL) Resource Allocation (RA) type2 Localized Virtual Resource Block (LVRB) mode or uplink (UL) no hopping mode; and allocating the public RB to the terminal of the second system by using a DL RA type2 Distributed Virtual Resource Block (DVRB) mode or UL hopping mode, the second operation:

allocating a public RB of the terminal of the first system and the terminal of the second system to the terminal of the first system or the terminal of the second system by using a downlink (DL) Resource Allocation (RA) type0 mode, DL RA type1 mode, DL RA type2 mode, uplink (UL) no hopping mode, or UL hopping mode; and allocating a dedicated RB of the terminal of the second system to the terminal of the second system by using a DL RA type0 mode, DL RA type1 mode, DL RA type2 Localized Virtual Resource Block (LVRB) mode, UL no hopping mode, or UL mirror hopping mode, wherein: the allocating the public RB of the terminal of the first system and the terminal of the second system to the terminal of the second system by using the DL RA type0 mode comprises:

dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs; and allocating each RBG to the terminal of the second system by using a bitmap mode, the third operation:

allocating a public RB of the terminal of the first system and the terminal of the second system to the terminal of the first system or the terminal of the second system by using a downlink (DL) Resource Allocation (RA) type0 mode, DL RA type1 mode, DL RA type2 mode, uplink (UL) no hopping mode, or UL hopping mode; and allocating a dedicated RB of the terminal of the second system to the terminal of the second system by using a DL RA type0 mode, DL RA type1 mode, DL RA type2 Localized Virtual Resource Block (LVRB) mode, UL no hopping mode, or UL mirror hopping mode, wherein: the allocating the public RB of the terminal of the first system and the terminal of the second system to the terminal of the second system by using the DL RA type1 mode comprises:

dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs;

dividing the RBGs into RBG subsets, wherein the number of the RBG subsets is the same as the resource allocation granularity or integer times of the resource allocation granularity; and allocating RBs in each RBG subset to the terminal of the second system by using a bitmap mode.

6. The method according to claim 5, wherein: the allocating the dedicated RB of the second system to the terminal of the second system by using the DL RA type0 mode comprises:

combining the dedicated RB into one or more Resource Block Groups (RBGs) according to dedicated parts of the dedicated RB, or dividing the dedicated RB into one or more RBGs according to resource allocation granularity of the terminal of the first system or integer times of the resource allocation granularity; and allocating each RBG to the terminal of the second system by using a bitmap mode.

7. The method according to claim 5, wherein: the allocating the dedicated RB of the second system to the terminal of the second system by using the DL RA type1 mode comprises:

combining the dedicated RB into one or more Resource Block Groups (RBGs) according to the dedicated parts of the dedicated RB, or dividing the dedicated RB into one or more RBGs according to resource allocation granularity of the terminal of the first system or integer times of the resource allocation granularity;

dividing the RBGs into RBG subsets, wherein the number of the RBG subsets is the same as the number of dedicated parts of the dedicated RB, the resource allocation granularity or integer times of the resource allocation granularity; and allocating RBs in each RBG subset to the terminal of the second system by using a bitmap mode.

8. The method according to claim 5, wherein:

the RBs comprise a public RB of the terminal of the first system and the terminal of the second system, and a dedicated RB of the terminal of the second system, and a dedicated RB exists on at least side of the public RB.

9. A network device, comprising:

a sorting unit, configured to sort Resource Blocks (RBs) used by a terminal of a first system and a terminal of a second system according to a use situation of the RBs used by the terminal of the first system and the terminal of the second system; and an allocating unit, configured to allocate the RBs sorted by the sorting unit, wherein the second system is a system which is evolved from the first system and is capable of providing a communication service for terminals of the first system, wherein: the sorting unit is further configured to:

sort the RBs used by the terminal of the first system and the terminal of the second system, wherein the sorting starts from a public RB of the terminal of the first system and the terminal of the second system, wherein: the allocating unit is further configured to perform one of the following operations:

the first operation:

allocating continuous Physical Resource Blocks (PRBs) to the terminal of the second system by using a downlink (DL) Resource Allocation (RA) type2 Localized Virtual Resource Block (LVRB) mode or uplink (UL) no hopping mode; and allocating the public RB to the terminal of the second system by using a DL RA type2 Distributed Virtual Resource Block (DVRB) mode or UL hopping mode, the second operation:

allocating the public RB of a terminal of a backward-compatible system and a terminal of an evolved system to the terminal of the backward-compatible system or the terminal of the evolved system by using a downlink (DL) Resource Allocation (RA) type0 mode, DL RA type1 mode, DL RA type2 mode, uplink (UL) no hopping mode, or UL hopping mode; and/or
allocating a dedicated RB of the terminal of the evolved system to the terminal of the evolved system by using a DL RA type0 mode, DL RA type1 mode, UL no hopping mode, or UL mirror hopping mode;
wherein the backward-compatible system is the first system, and the evolved system is the second system,
wherein: the allocating the public RB of the terminal of the first system and the terminal of the second system to the terminal of the second system by using the DL RA type0 mode comprises:
dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs; and
allocating each RBG to the terminal of the second system by using a bitmap mode,
the third operation:
allocating the public RB of a terminal of a backward-compatible system and a terminal of an evolved system to the terminal of the backward-compatible system or the terminal of the evolved system by using a downlink (DL) Resource Allocation (RA) type0 mode, DL RA type1 mode, DL RA type2 mode, uplink (UL) no hopping mode, or UL hopping mode; and/or
allocating a dedicated RB of the terminal of the evolved system to the terminal of the evolved system by using a DL RA type0 mode, DL RA type1 mode, UL no hopping mode, or UL mirror hopping mode;
wherein the backward-compatible system is the first system, and the evolved system is the second system,
wherein: the allocating the public RB of the terminal of the first system and the terminal of the second system to the terminal of the second system by using the DL RA type1 mode comprises:
dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs;
dividing the RBGs into RBG subsets, wherein the number of the RBG subsets is the same as the resource allocation granularity or integer times of the resource allocation granularity; and
allocating RBs in each RBG subset to the terminal of the second system by using a bitmap mode.

10. The network device according to claim 9, wherein:
the RBs comprise a public RB of the terminal of the first system and the terminal of the second system, and a dedicated RB of the terminal of the second system, and a dedicated RB exists on at least side of the public RB.

11. A network device, comprising:
a sorting unit, configured to sort Resource Blocks (RBs) used by a terminal of a first system and a terminal of a second system according to a use situation of the RBs used by the terminal of the first system and the terminal of the second system; and
an allocating unit, configured to allocate the RBs sorted by the sorting unit,
wherein the second system is a system which is evolved from the first system and is capable of providing a communication service for terminals of the first system,
wherein: the sorting unit is further configured to:
sort RBs used by the terminal of the first system and sorting RBs used by the terminal of the second system separately,
wherein: the allocating unit is further configured to perform one of the following operations:
the first operation:
allocating continuous Physical Resource Blocks (PRBs) to the terminal of the second system by using a downlink (DL) Resource Allocation (RA) type2 Localized Virtual Resource Block (LVRB) mode or uplink (UL) no hopping mode; and
allocating the public RB to the terminal of the second system by using a DL RA type2 Distributed Virtual Resource Block (DVRB) mode or UL hopping mode,
the second operation:
allocating a public RB of the terminal of the first system and the terminal of the second system to the terminal of the first system or the terminal of the second system by using a downlink (DL) Resource Allocation (RA) type0 mode, DL RA type1 mode, DL RA type2 mode, uplink (UL) no hopping mode, or UL hopping mode; and
allocating a dedicated RB of the terminal of the second system to the terminal of the second system by using a DL RA type0 mode, DL RA type1 mode, DL RA type2 Localized Virtual Resource Block (LVRB) mode, UL no hopping mode, or UL mirror hopping mode,
wherein: the allocating the public RB of the terminal of the first system and the terminal of the second system to the terminal of the second system by using the DL RA type0 mode comprises:
dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs; and
allocating each RBG to the terminal of the second system by using a bitmap mode,
the third operation:
allocating a public RB of the terminal of the first system and the terminal of the second system to the terminal of the first system or the terminal of the second system by using a downlink (DL) Resource Allocation (RA) type0 mode, DL RA type1 mode, DL RA type2 mode, uplink (UL) no hopping mode, or UL hopping mode; and
allocating a dedicated RB of the terminal of the second system to the terminal of the second system by using a DL RA type0 mode, DL RA type1 mode, DL RA type2 Localized Virtual Resource Block (LVRB) mode, UL no hopping mode, or UL mirror hopping mode,
wherein: the allocating the public RB of the terminal of the first system and the terminal of the second system to the terminal of the second system by using the DL RA type1 mode comprises:
dividing the public RB into one or more Resource Block Groups (RBGs) according to resource allocation granularity of the terminal of the first system or integer times of the resource allocation granularity, wherein each RBG of the terminal of the second system is aligned with one or more RBGs of the terminal of the first system, and each RBG includes several RBs;

dividing the RBGs into RBG subsets, wherein the number of the RBG subsets is the same as the resource allocation granularity or integer times of the resource allocation granularity; and allocating RBs in each RBG subset to the terminal of the second system by using a bitmap mode.

12. The network device according to claim 11, wherein:

the RBs comprise a public RB of the terminal of the first system and the terminal of the second system, and a dedicated RB of the terminal of the second system, and a dedicated RB exists on at least side of the public RB.

* * * * *